US012138220B1

(12) United States Patent
Lin et al.

(10) Patent No.: US 12,138,220 B1
(45) Date of Patent: Nov. 12, 2024

(54) MASSAGE DEVICE GENERATING SUCTION AND AIR SUCTION AND RELEASE DRIVING ASSEMBLY THEREOF

(71) Applicant: GLKADIMA INC., Albany, NY (US)

(72) Inventors: Geli Lin, Albany, NY (US); Xin Chen, Albany, NY (US)

(73) Assignee: GLKADIMA INC., Albany, NY (US)

( * ) Notice: Subject to any disclaimer, the term of this patent is extended or adjusted under 35 U.S.C. 154(b) by 0 days.

(21) Appl. No.: 18/408,529

(22) Filed: Jan. 9, 2024

(30) Foreign Application Priority Data

Oct. 24, 2023 (CN) ........................ 202311384458.7

(51) Int. Cl.
*A61H 9/00* (2006.01)

(52) U.S. Cl.
CPC ......... *A61H 9/0007* (2013.01); *A61H 9/0057* (2013.01); *A61H 2201/0153* (2013.01); *A61H 2201/1215* (2013.01); *A61H 2201/5056* (2013.01)

(58) Field of Classification Search
CPC .. A61H 9/005–0057; A61H 2009/0064; A61H 7/00–008; A61H 2007/009; A61H 19/00–50; A61H 23/00–06; A61H 2023/002–045; A61N 1/00–445
USPC .............................................................. 601/9
See application file for complete search history.

(56) References Cited

U.S. PATENT DOCUMENTS

2021/0161757 A1* 6/2021 Murison ................ A61H 21/00
2022/0110819 A1* 4/2022 Guo ..................... A61H 9/0057
2023/0022993 A1* 1/2023 Yu ............................ A61H 7/00
2023/0048210 A1* 2/2023 Chen ....................... A61H 7/001
2023/0390144 A1* 12/2023 He ....................... A61H 9/0007

* cited by examiner

*Primary Examiner* — Valerie L Woodward
*Assistant Examiner* — Paige Kathleen Bugg
(74) *Attorney, Agent, or Firm* — Ying-Ting Chen

(57) ABSTRACT

A massage device includes a flexible massage housing, a fixing casing, and an air suction and release driving assembly including a chamber body, a plug movably disposed in the chamber body to form a first chamber and a second chamber, and a driving unit coupled to the plug, wherein when the driving unit drives the plug to reciprocate in the chamber body, an air pressure of the first chamber of the chamber body is adjusted, so as to allow the massage device to generate suction.

5 Claims, 20 Drawing Sheets

MASSAGE DEVICE GENERATING SUCTION AND AIR SUCTION AND RELEASE DRIVING ASSEMBLY THEREOF

CROSS REFERENCE OF RELATED APPLICATION

This application is a non-provisional application that claims priority under 35U.S.C. § 119 to China application number CN202311384458.7, filing date Oct. 24, 2023, wherein the entire content of which is expressly incorporated herein by reference.

BACKGROUND OF THE PRESENT INVENTION

Field of Invention

The present invention relates to the field of massage health technology, and more particularly to a massage device that generates suction and an air suction and release driving assembly which can provide suction massage to the human body by periodically inhaling and exhaling air to drive the massage device.

Description of Related Arts

An air suction massage device can provide various massage health effects, such as relaxing muscles, relieving muscle fatigue and stiffness, promoting blood circulation for helping to deliver oxygen and nutrients to tissues to aid in tissue recovery and repair, alleviating pain, improving skin elasticity and texture, reducing fine lines and wrinkles, making the skin appear younger and healthier, relaxing the body, reducing stress and anxiety, improving sleep quality, etc.

A conventional suction massage device generates a negative pressure between the human body part and the suction massage device by means of squeezing a chamber body, thereby further exerting a suction force on the human body part. However, the conventional method of generating the negative pressure can result in limited negative pressure effect, insufficient suction force, and also is difficult to control. The gas flow path inside the suction massage device is not smooth, and may easily cause turbulence and affect the massage performance.

SUMMARY OF THE PRESENT INVENTION

The invention is advantageous in that it provides a massage device and air suction and release driving assembly which adjusts an air pressure in a chamber by driving a plug to move back and forth in the chamber, so as to generate suction force in the air suction and release driving assembly to drive the massage action of the massage device.

Another advantage of the present invention is to provide a massage device and air suction and release driving assembly thereof, wherein the air suction and release driving assembly generates a cyclic operation of air suction and release, so as to generate suction force when the flexible massage housing is contacting the user's body part, and exert massage on the user's body part.

Another advantage of the present invention is to provide a massage device and air suction and release driving assembly thereof which provides a seamless and circulating air intake and exhaust path to ensure its suction effect.

Another advantage of the present invention is to provide a massage device and air suction and release driving assembly thereof, wherein in one embodiment, during the air intake and exhaust process, the air suction and release driving assembly can automatically form an air intake path and an air exhaust path.

Another advantage of the present invention is to provide a massage device and air suction and release driving assembly thereof, wherein the air suction and release driving assembly generates suction at its end and releases air at a side thereof, so that there is no air release at the end to affect the massage effect and the gas flow path is smoother without turbulence and blockage.

Another advantage of the present invention is to provide a massage device and air suction and release driving assembly thereof, wherein air discharge is prevented during the suction process by a micro-movable flexible valve, thereby effectively ensuring the negative pressure effect to generate the sufficient suction.

Another advantage of the present invention is to provide a massage device and air suction and release driving assembly thereof which periodically drives the plug to reciprocate by a driving motor, thereby conveniently generating suction periodically and enhancing the continuous massage effect.

Another advantage of the present invention is to provide a massage device and air suction and release driving assembly thereof which enhances the waterproof effect by setting a waterproof sealing ring, so as to avoid water entering the interior of the air suction and release driving assembly to cause short circuit and damage to electronic components.

Another advantage of the present invention is to provide a massage device and air suction and release driving assembly thereof, wherein the fixing casing is extending in a curved manner, so that the cavity of the air suction and release driving assembly can be assembled with the driving motor along mutually perpendicular directions conveniently, so as to reasonably utilize space and reduce the size of the entire massage device, and it is also convenient for the user to hold the massage device and direct the massage head to have contact with the user's body part at a predetermined angle.

Another advantage of the present invention is to provide a massage device and air suction and release driving assembly thereof, wherein the massage device can be used to massage a human body part such as head, neck, shoulder, back, arm, leg, and waist of the user.

Another advantage of the present invention is to provide a massage device and air suction and release driving assembly thereof, wherein the massage device which is capable of generating suction can be used as an adult sucking tool for stimulating a woman body part such as clit and nipple, so as to give pleasure to the user.

Additional advantages and features of the invention will become apparent from the description which follows, and may be realized by means of the instrumentalities and combinations particularly pointing out in the appended claims.

According to the present invention, the foregoing and other objects and advantages are attained by a massage device, comprising:

a fixing casing; and an air suction and release driving assembly fixed in the fixing casing, wherein the air suction and release driving assembly comprises:

a chamber body:

a plug movably disposed in the chamber body to form a first chamber; and a driving unit coupled to the plug, wherein when the driving unit drives the plug to reciprocate in the chamber body, an air pressure of the first chamber of the chamber body is adjusted, so as to allow the massage device to generate suction.

According to an embodiment, the chamber body forms the first chamber and a second chamber on opposite sides of the plug, and when the driving unit drives the plug to periodically reciprocate in the chamber body, the volume sizes of the first chamber and the second chamber are adjusted.

According to an embodiment, a top side of the chamber body is provided with one or more through holes which are communicated with the first chamber for air suction and exhaust.

According to an embodiment, a top side of the chamber body is formed with two through holes which are communicated to the first chamber, wherein the two through holes comprise a first through hole and a second through hole which are respectively provided with an inlet check valve and an outlet check valve.

According to an embodiment, the inlet check valve is disposed at a bottom side of the first through hole, and the outlet check valve is disposed on a top side of the second through hole.

According to an embodiment, the second chamber is provided with an exhaust hole, wherein the driving unit drives the plug to reciprocate in the chamber body to form an inhalation process and an exhalation process, so as to adjust the air pressure in the first chamber, and in the inhalation process, the air in the first chamber is prevented from entering the second chamber, and in the exhalation process, at least a part of the air in the first chamber is allowed to enter the second chamber and discharged through the exhaust hole.

According to an embodiment, the chamber body comprises a surrounding wall forming the exhaust hole which is communicated with the second chamber, wherein the plug has one or more vent holes, and the plug is provided with a flexible valve element which is arranged to allow or prevent the first chamber from communicating with the second chamber through the one or more vent holes.

According to an embodiment, a bottom side of the second chamber of the chamber body is formed with the exhaust hole which is communicated to the second chamber, wherein the plug has one or more vent holes, and the plug is provided with a flexible valve element which is arranged to allow or prevent the first chamber from communicating with the second chamber through the one or more vent holes.

According to an embodiment, the plug has an assembly groove, and the flexible valve element is disposed in the assembly groove and is aligned with the one or more vent holes, wherein when the plug is driven to move to increase the volume size of the first chamber, the flexible valve element in the assembly groove is tightly attached to a bottom side of the plug, so that the one or more vent holes are not communicated with the second chamber, thereby allowing the massage device to generate suction, and when the plug is driven to move to decrease the volume size of the first chamber, the flexible valve element in the assembly groove is spaced apart from the bottom side of the plug body to allow a part of the air in the first chamber to enter the second chamber through the one or more vent holes, so as to be discharged through the exhaust hole.

According to an embodiment, the driving unit comprises a driving motor, a transmission unit, and a driving rod, wherein the driving rod is connected to the plug, and when the driving motor is in operation, the driving motor drives the driving rod to move back and forth periodically through the transmission unit, so as to driving the plug to move back and forth periodically in the chamber body.

According to an embodiment, the driving motor comprises a motor body and an output shaft, and the transmission unit comprises a first driving gear and a second driving gear, wherein the second driving gear comprises an eccentric shaft, the first driving gear is connected to the output shaft of the driving motor, the second driving gear is engaged with with the first driving gear, and a bottom end of the driving rod has a connecting hole, and the eccentric shaft of the second driving gear is positioned in the connecting hole of the driving rod.

According to an embodiment, the massage device further comprises a flexible massage housing, wherein the flexible massage housing comprises a head housing part with an opening hole, the fixing casing has an end hole, the opening hole of the head housing part is communicated to the end hole, and the fixing casing has an end cavity to form a pressure adjustment cavity which is communicated to the first chamber.

According to an embodiment, an edge of the plug forms a circular positioning groove, wherein a flexible sealing element is disposed in the circular positioning groove.

According an another aspect of the present invention, the present invention further provides an air suction and release driving assembly for a massage device, wherein the ir suction and release driving assembly comprises:

a chamber body:

a plug movably disposed in the chamber body to form a first chamber; and a driving unit coupled to the plug, wherein when the driving unit drives the plug to reciprocate in the chamber body, an air pressure of the first chamber of the chamber body is adjusted, so as to allow the massage device to generate suction.

According an another aspect of the present invention, the present invention further provides an air suction and release driving assembly for a massage device, wherein the ir suction and release driving assembly comprises:

a chamber body:

a plug movably disposed in the chamber body to form a first chamber and a second chamber having an exhaust hole; and a driving unit coupled to the plug, wherein the driving unit drives the plug to reciprocate in the chamber body to form an inhalation process and an exhalation process, so as to adjust the air pressure in the first chamber, and in the inhalation process, the air in the first chamber is prevented from entering the second chamber, and in the exhalation process, at least a part of the air in the first chamber is allowed to enter the second chamber and discharged through the exhaust hole.

The present invention also provides a massage method by a massage device, wherein the method comprises the following steps:

(a) driving a transmission unit by a driving motor to drive a driving rod to move a plug in a chamber body to increase a volume size of a first chamber, wherein the air in a pressure adjustment cavity is allowed to enter the first chamber through at least one through hole to cause suction at an opening hole of a flexible massage housing; and (b) driving the transmission unit by the driving motor to drive the driving rod to move the plug in the chamber body to reduce the volume size of the first chamber, wherein the air in the first chamber is allowed to enter the pressure adjustment cavity through the through hole and blow towards the opening hole of the flexible massage housing.

The present invention also provides a massage method by a massage device, comprising the following steps:

(A) driving a transmission unit by a driving motor to drive a driving rod to drive a plug to move in a chamber body to increase a volume size of a first chamber and allow air from a pressure adjustment cavity to enter the first chamber and be blocked from entering a second chamber by a flexible valve element, so as to create suction at an opening hole of a flexible massage housing; and (B) driving the transmission unit by the driving motor to drive the driving rod to drive the plug to move in the chamber body to reduce the volume size of the first chamber, and allowing at least a portion of the air in the first chamber to enter the second chamber through one or more vent holes and be discharged from an exhaust hole which is communicated to the second chamber.

According to an embodiment, the method further comprises a step of reciprocating a driving rod by reciprocating a eccentric shaft of the transmission unit driven by the driving motor, thereby further driving the plug to reciprocate in the chamber body.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
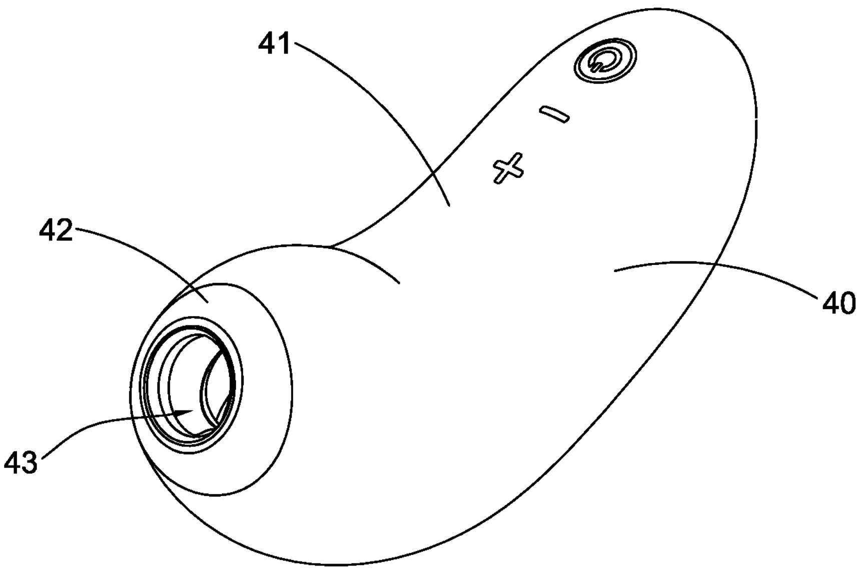
FIG. 1 is a perspective view of a massage device according to a first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIGS. 1 to 8, a massage device and an air suction and release driving assembly 1 according to a first preferred embodiment of the present invention are provided. The massage device comprises the air suction and release driving assembly 1, a flexible massage housing 40, a fixing casing 50, a controller 60, and a power module 70. It can be understood that the air suction and release driving assembly 1 of the present invention is a driving unit used to drive the massage device. The massage device may comprises the controller 60, the power module 70, the flexible massage housing 40 implemented as a circuit board, and other massage components such as a vibrator. The controller 60 and the power module 70 of the massage device can be electrically connected to a driving unit 30 of the air suction and release driving assembly 1 to provide power supply and control the operation of the driving unit 30. The flexible massage housing 40 can be fitted at an outer side of the fixing casing 50 which is installed with the air suction and release driving assembly 1, and the flexible massage housing 40 can be implemented as a silicone sleeve or rubber sleeve suitable for contacting with a human body part.

Figure 2:
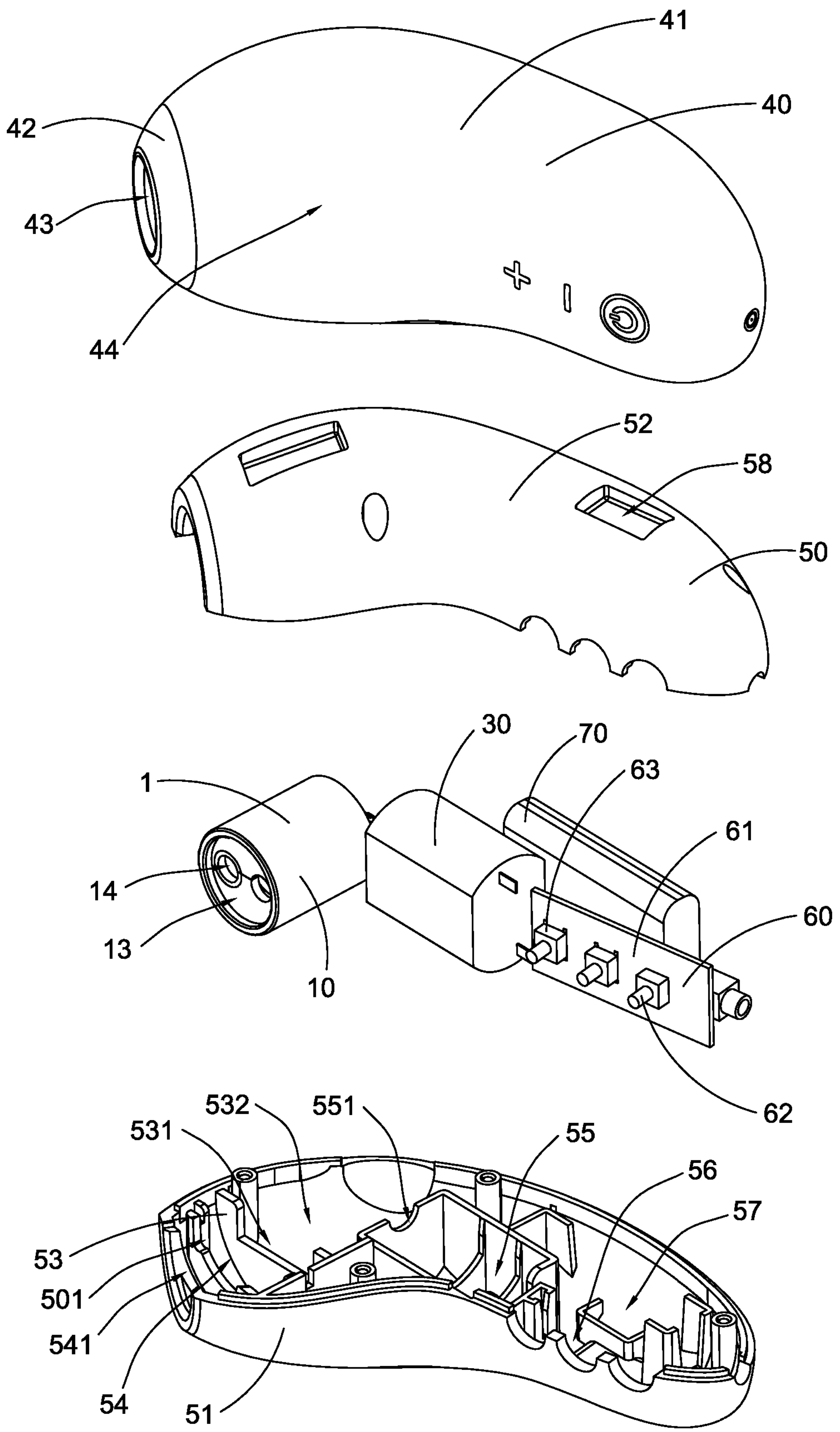
FIG. 2 is an exploded view of the massage device according to the above first preferred embodiment of the present invention.
Figure 3:
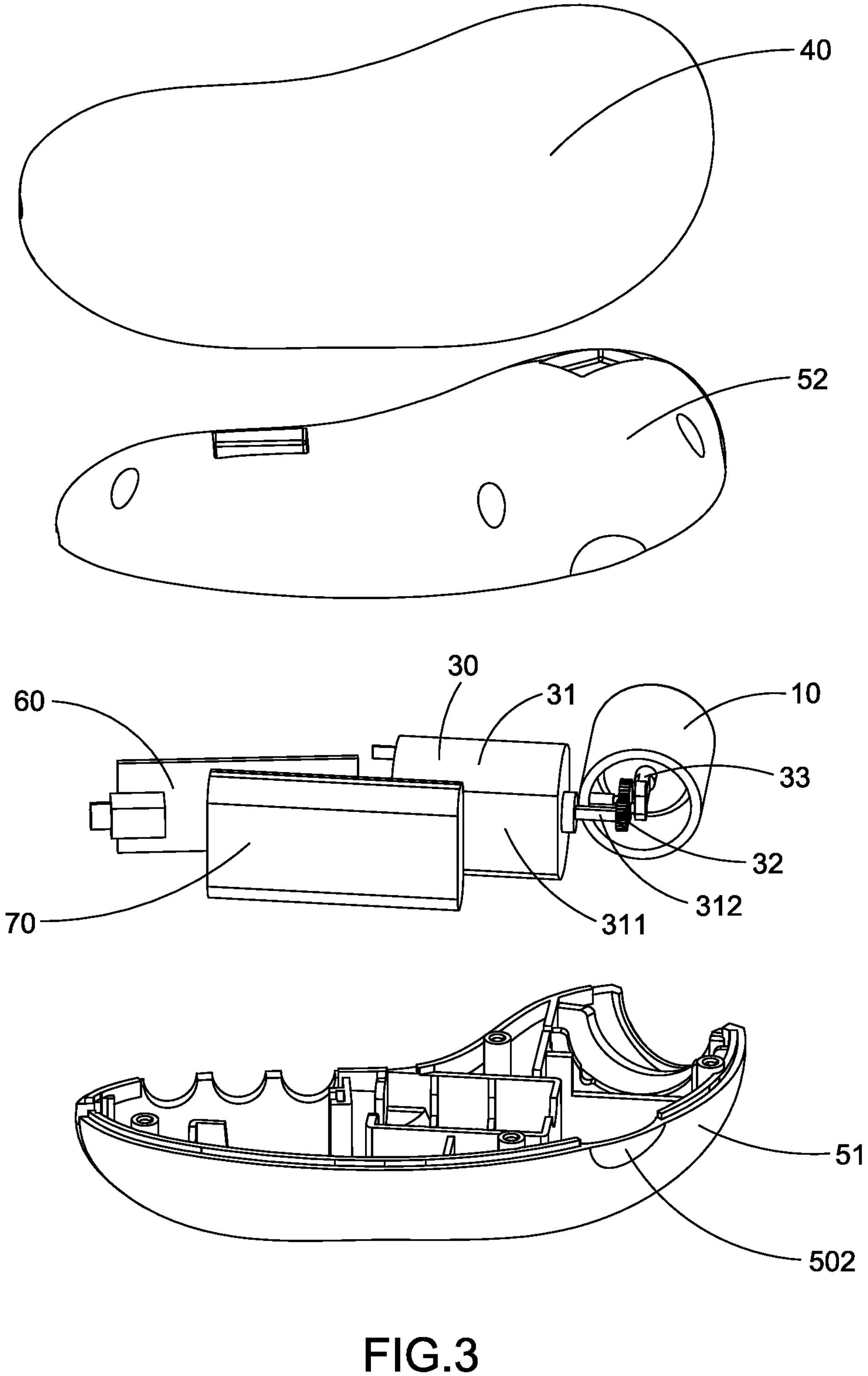
FIG. 3 is an exploded view from another angle of the massage device according to the above first preferred embodiment of the present invention.
Figure 4:
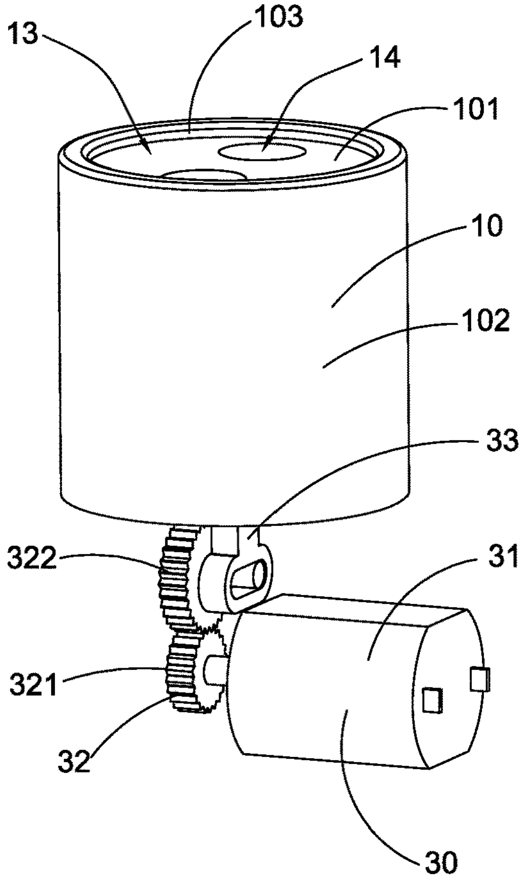
FIG. 4 is a perspective view of an air suction and release driving assembly of the massage device according to the above first preferred embodiment of the present invention.
Figure 5:
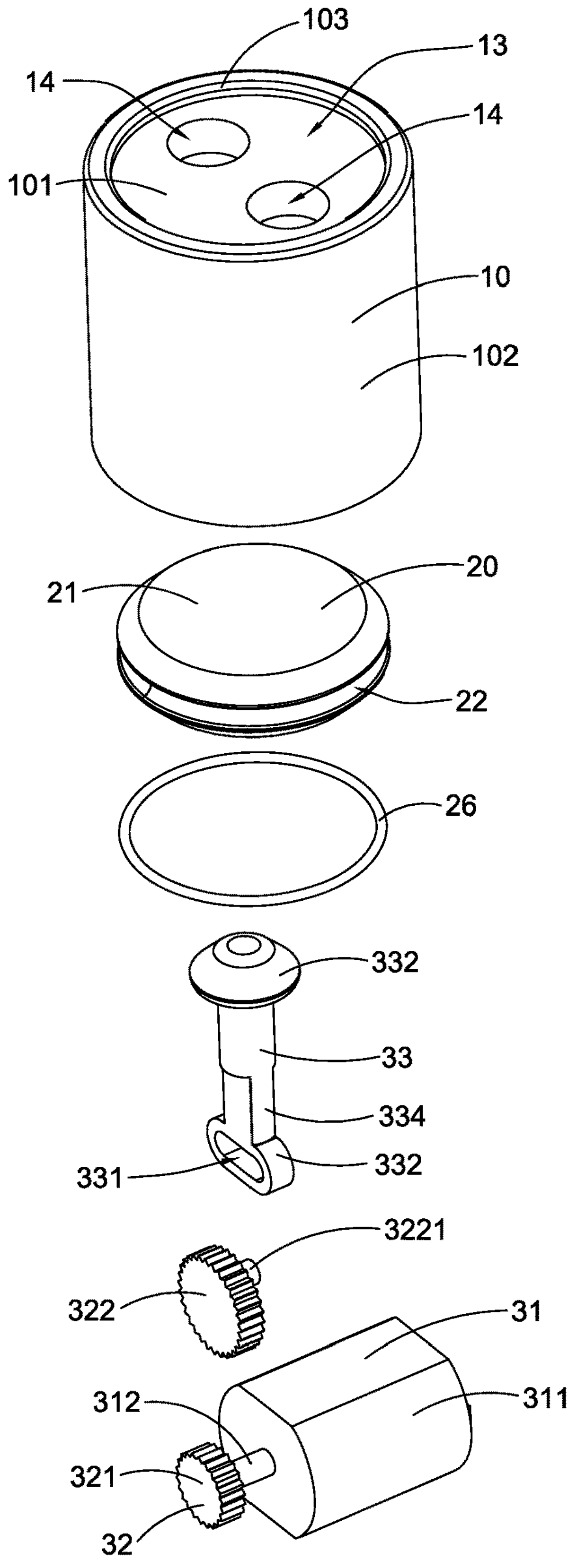
FIG. 5 is an exploded view of the air suction and release driving assembly of the massage device according to the above first preferred embodiment of the present invention.

As shown in FIGS. 2 and 3, the flexible massage housing 40 comprises a main body 41 and a head housing portion 42. The head housing portion 42 has an opening hole 43 and is connected to the main body 41 to form an inner cavity 44 inside for accommodating the air suction and release driving assembly 1, the fixing casing 50, the controller 60, and the power module 70. The opening hole 43 is in communication with the inner cavity 44 and allows air to enter and exit under the driving action of the air suction and release driving assembly 1.

The main body 41 and the head housing portion 42 can be integrally formed and made of flexible material. Alternatively, the head housing portion 42 can be made of flexible material while the main body 41 can be made of flexible or rigid material. In this embodiment, the main body 41 and the head housing portion 42 are integrally formed using the same flexible material such as silicone or rubber, forming a one-piece structure with the inner cavity 44 through methods such as hot pressing or injection molding.

The fixing casing 50 is used to assemble the air suction and release driving assembly 1, the controller 60, and the power module 70. The massage housing 40 is placed outside the fixing casing 50, thereby accommodating the fixing casing 50, the air suction and release driving assembly 1, the controller 60, and the power module 70 inside the massage housing 40.

The power module 70 comprises a rechargeable battery, such as a lithium battery, lead-acid battery, nickel-cadmium battery, nickel-iron battery, nickel-hydrogen battery, etc., to provide power supply for the controller 60 and the air suction and release driving assembly 1. The controller 60 comprises a control circuit board 61 and one or more switches 62, and each of the switches 60, for example, can be a button, knob, etc., exposed outside the massage housing 40 for user operation. In the illustrated example in the drawings, each switch 62 is a button. The controller 60 can also control one or more control components 63, such as two control components 63, to respectively control the working power of the air suction and release driving assembly.

As shown in FIGS. 4 to 8, the air suction and release driving assembly 1 comprises a chamber body 10, a plug 20 movably disposed within the chamber body 10, and the driving unit 30 for driving the plug 20. The plug 20 is arranged within the chamber body 10 to form a first chamber 11 and a second chamber 12 respectively located on opposite sides of the plug 20. When the driving unit 30 drives the plug 20 to move back and forth in the chamber body 10, the volume sizes of the first chamber 11 and the second chamber 12 can be adjusted, thereby adjusting the air pressure in the first chamber 11 to provide the suction force required by the massage device.

In this embodiment, the chamber body 10 has a groove 13 on a top side thereof which is communicated to the opening hole 43 of the massage housing 40. The chamber body 10 also has one or more through holes 14 on the top side thereof, such as two through holes, which communicate the exterior of the chamber body 10 to the first chamber 11 of the chamber body 10. The first chamber 11 is used to generate negative pressure, thereby creating a negative pressure between the massage device and the human body, so as to achieve the effect of massaging the human body by generating suction.

In this embodiment, the chamber body 10 comprises a top wall 101, a surrounding wall 102, an extending wall 103, and has an end opening 104. The surrounding wall 102 is extended integrally from the top wall 101 to form an internal space with one end opening. The extending wall 103 is extended integrally from an edge of the top wall 101 to form the groove 13 between the top wall 101 and the extending wall 103. The first chamber 11 is formed between the top wall 101 and the plug 20, and the second chamber 12 is formed between the plug 20 and the end opening 104. The through holes 14 are formed in the top wall 101 and penetrate through the top wall 101 to communicate with the first chamber 11.

In other words, when the opening hole 43 of the massage housing 40 of the massage device is close to the human body, changes in air pressure under the action of the plug 20 can be generated in the first chamber 11. Specifically, because the groove 13 is communicated to the opening hole 43, air is sucked into the first chamber 11 from the groove 13 at the top side of the chamber body 10 when the first chamber 11 is inhaled. The skin tissue or muscles of the human body adjacent to the opening hole 43 formed by the head housing portion 42 of the massage housing 40 are sucked towards the opening hole 43. When the first chamber 11 is released, the air in the first chamber 11 enters the groove 13 on the top side of the chamber body 10, and the skin tissue or muscles of the human body adjacent to the opening hole 43 formed by the head housing portion 42 of the massage housing 40 are released. In this way, the massage device uses the air suction and release driving assembly 1 to generate changes in air pressure in the first chamber 11, so that the opening hole 43 and the groove 13 at corresponding positions generate changes in air pressure, thereby achieving a suction massage on the human body.

In this embodiment, the plug 20 comprises a plug body 21 which separates the first chamber 11 from the second chamber 12, so as to form a pressure-adjustable environment in the first chamber 11 to generate suction. The chamber body 10 can be cylindrical, thus forming a cylindrical space inside. Accordingly, the plug body 21 of the plug 20 can be embodied to comprise a cylindrical sealing pad.

The edge of the plug body 21 can also be formed with a circular positioning groove 22 which is used to accommodate a flexible sealing element 26 such as a flexible rubber ring or a flexible film, which can serve as a waterproof seal to enhance airtightness and further prevent water entering the second chamber 12 from the first chamber 11 to cause a short circuit of electronic components.

The driving unit 30 comprises a driving motor 31, a transmission unit 32, and a driving rod 33, wherein the driving rod 33 is connected to the plug body 21 and partially enters the second chamber 12. When the driving motor 31 is in operation, it drives the driving rod 33 to move periodically and reciprocally through the transmission unit 32, thereby further driving the plug 20 to move periodically and reciprocally in the chamber body 10, thereby adjusting the volume size of the first chamber 11 to generate the suction required by the massage device.

The driving rod 33 comprises an installation end 332 adjacent to the plug 20 and a connecting end 333 adjacent to the driving motor 31 away from the plug 20. The driving rod 33 comprises a rod body 334 between the installation end 332 and the connecting end 333. The installation end 332 and the connecting end 333 are enlarged end portion in comparison with the rod body 334. The installation end 332 is embedded in the bottom of the plug 20 to be securely installed on the plug 20. The connecting end 333 has a connecting hole 331.

More specifically, in this embodiment, the driving motor 31 is a motor comprising a motor body 311 and an output shaft 312. The transmission unit 32 comprises a first driving gear 321 and a second driving gear 322 which comprises an eccentric shaft 3221. The first driving gear 321 is connected to the output shaft 312 of the driving motor 31, and the second driving gear 322 is engaged with the first driving gear 321. The bottom end of the driving rod 33 has the connecting hole 331. An eccentric shaft 3221 of the second driving gear 322 is positioned in the connecting hole 331 of the driving rod 33. When the driving motor 31 operates, the first driving gear 321 connected to the output shaft 3221 is driven to rotate, thereby driving the second driving gear 322 to rotate, causing the eccentric shaft 3221 to generate displacement, thereby driving the movement of the driving rod 33 through the movement of the eccentric shaft 3221, and ultimately driving the movement of the plug 20 in the chamber body 10. When the first driving gear 321 and the second driving gear 322 complete one rotation cycle, the plug 20 in the chamber body 10 generates a reciprocating movement cycle correspondingly.

More specifically, when the driving motor 31 rotates, it drives the first driving gear 321 and the second driving gear 322 to rotate through the output shaft 312, so that the eccentric shaft 3221 moves towards the direction of the driving motor 31. The driving rod 33 synchronously moves towards the direction of the driving motor 31, so that the plug 20 moves away from the top wall 101 of the chamber body 10 towards the direction of the driving motor 31, thereby increasing the volume of the first chamber 11 and causing the pressure in the space between the groove 13 and the opening hole 43 of the massage housing 40 to decrease, so as to form a negative pressure, thereby producing a suction massage on the human body.

By driving the first driving gear 321 and the second driving gear 322 through the output shaft 312, the eccentric shaft 3221 is driven to move away from the driving motor 31. When the eccentric shaft 3221 reaches the bottom position, it is driven upward by the second driving gear 322. The driving rod 33 synchronously moves away from the driving motor 31, causing the plug 20 to move towards the top wall 101 of the chamber body 10 in the direction away from the driving motor 31, thereby reducing the volume of the first chamber 11 and at the same time discharging gas to result in an increase in air pressure in the space between the groove 13 and the opening hole 43 of the massage housing 40, so as to restore the initial air pressure. In this way, by repeating the above process, the massage device can perform periodic suction massage on the human body.

Figure 6:
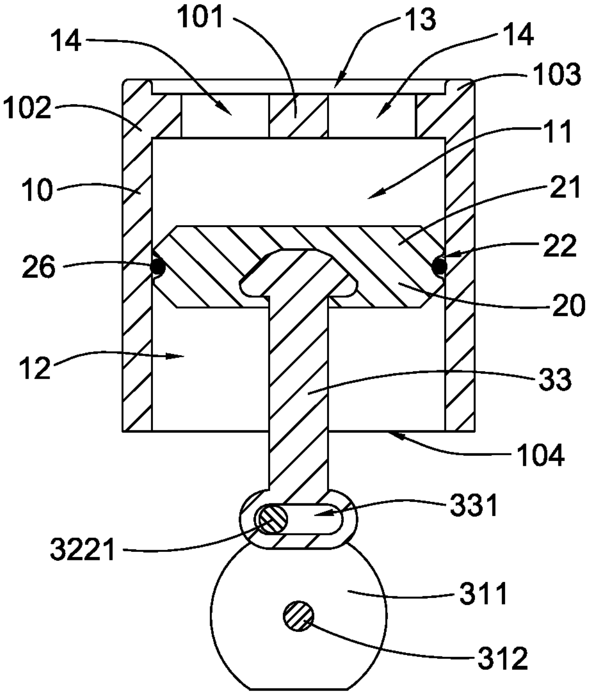
FIG. 6 is a sectional view of the air suction and release driving assembly of the massage device according to the above first preferred embodiment of the present invention.
Figure 7:
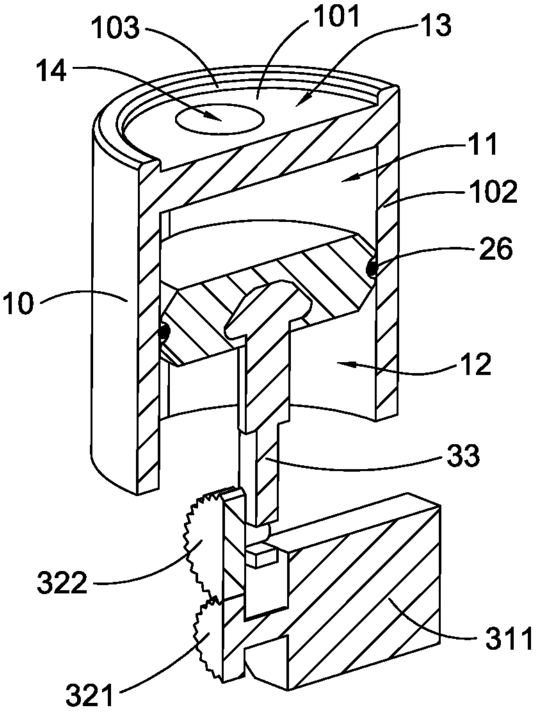
FIG. 7 is a perspective view of the air suction and release driving assembly of the massage device according to the above first preferred embodiment of the present invention after being cut along a center line.
Figure 8:
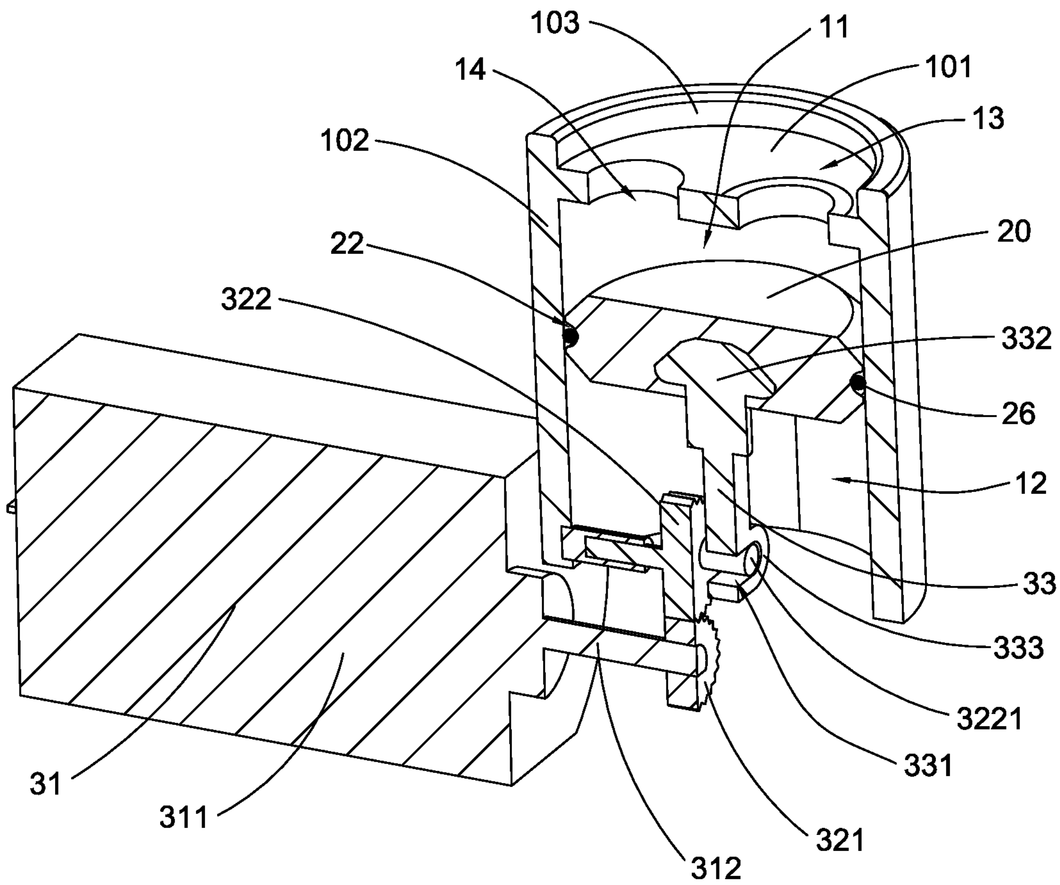
FIG. 8 is a perspective view from another angle of the air suction and release driving assembly of the massage device after being cut along the center line according to the above first preferred embodiment of the present invention.
Figure 9:
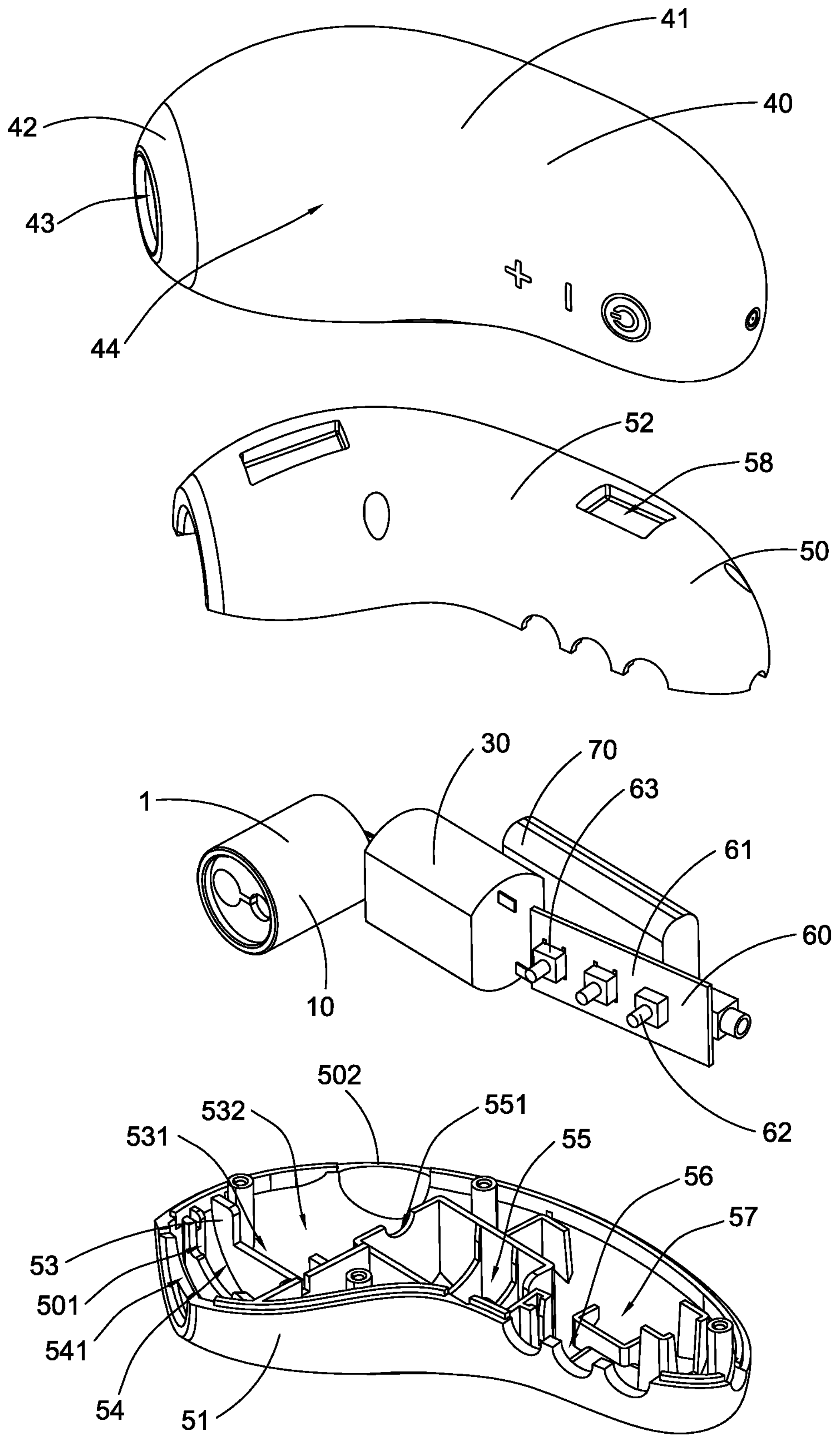
FIG. 9 is an exploded view of a massage device according to a second preferred embodiment of the present invention.
Figure 10:
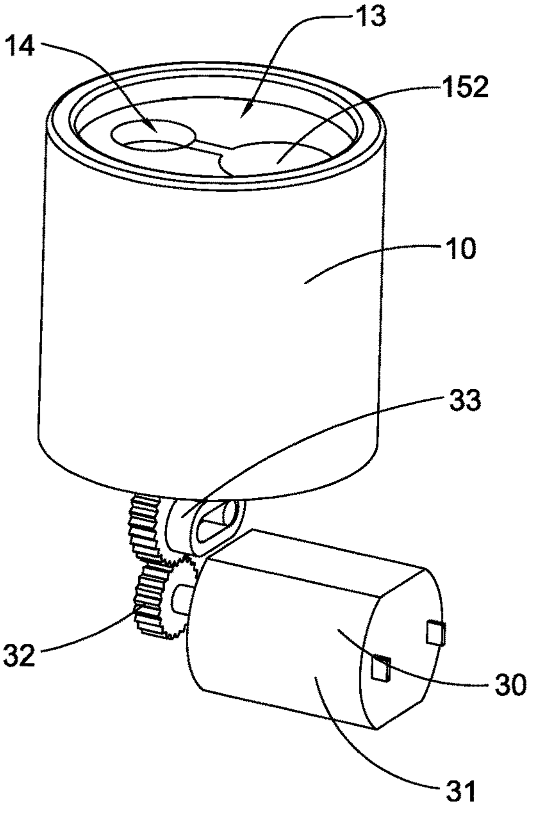
FIG. 10 is a perspective view of an air suction and release driving assembly of the massage device according to the above second preferred embodiment of the present invention.
Figure 11:
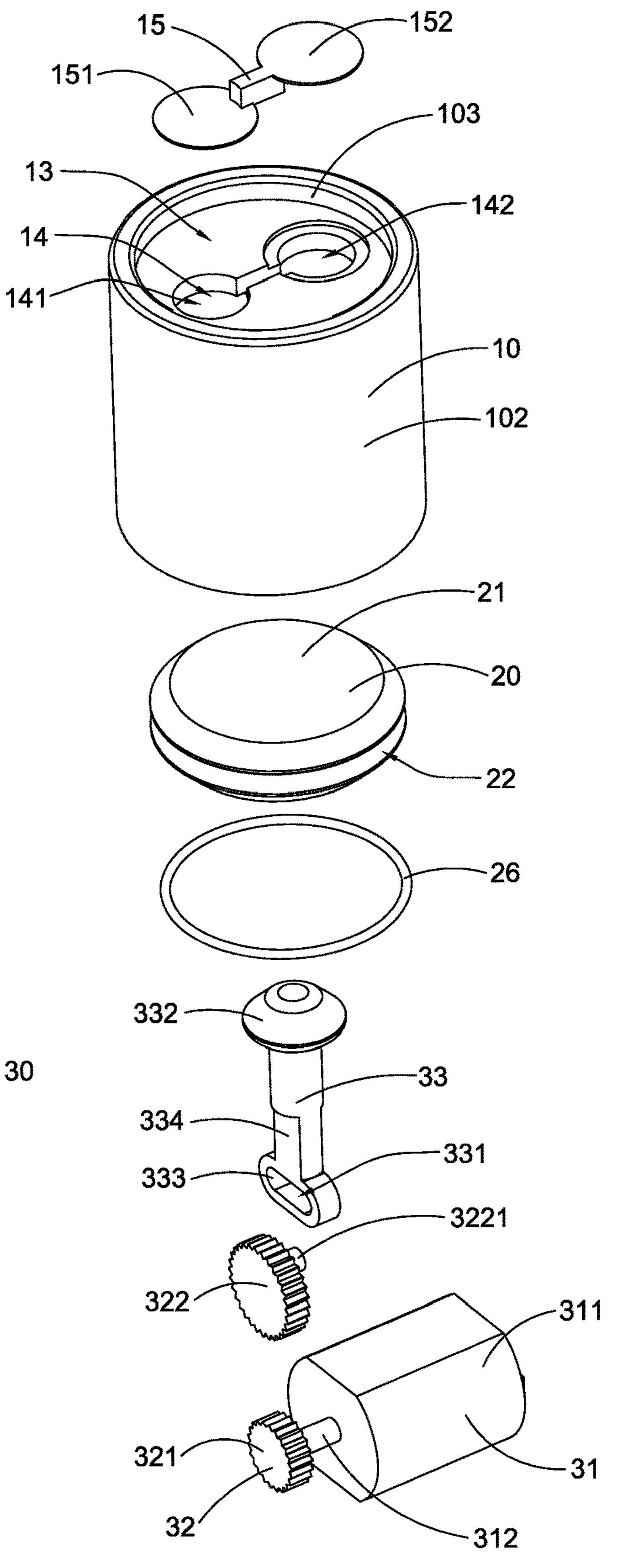
FIG. 11 is an exploded view of the air suction and release driving assembly of the massage device according to the above second preferred embodiment of the present invention.

Referring to FIGS. 6 and 7, according to the arrangement direction of the structural components shown in the drawings, the plug 20 is arranged in a direction indicated and illustrated in the drawings. When driven to move downward, the air enters the first chamber 11 through multiple through holes 14, thereby generating the suction force required by the massage device by the air suction and release driving assembly 1. When the plug 20 is driven upward, the air is discharged from the first chamber 11 through multiple through holes 14, thereby restoring the air suction and release driving assembly 1 to its initial state.

The fixing casing 50 in this embodiment comprises a first casing part 51 and a second casing part 52 which are assembled together to form a space accommodating the air suction and release driving assembly 1, the controller 60, and the power module 60.

More specifically, the fixing casing 50 comprises a positioning element 53 which forms a positioning groove 531. In this embodiment, the positioning element 53 comprises a positioning plate set on at least one of the first casing part 51 and the second casing part 52 with the positioning groove 531 formed in the middle. The chamber body 10 of the air suction and release driving assembly 1 is securely positioned in the positioning groove 531. It should be understood that in this embodiment, both the first casing part 51 and the second casing part 52 can comprise similar structures of the positioning component 511 and the positioning groove 531. When the first casing part 51 and the second casing part 52 are fastened together, the chamber body 10 of the air suction and release driving assembly 1 is positioned in the fixing slot formed by the two positioning grooves 531, and an assembling chamber 532 is formed in the fixing casing 50 to accommodate the chamber body 10 of the air suction and release driving assembly 1.

The fixing casing 50 further has an end cavity 54 which is located on a side of the positioning element 53 which is implemented as a positioning plate, the end cavity 54 and the assembling chamber 532 are formed on two opposite sides of the positioning element 53, and an end of the end cavity 54 has an end hole 541 which corresponds to the opening hole 43 of the massage housing 40. The end cavity 54 is communicated to the groove 13 on the top side of the chamber body 10 of the air suction and release driving assembly 1.

The end cavity 54 of the fixing casing 50 and the groove 13 of the air suction and release driving assembly 1 form a pressure adjustment cavity 501 which is communicated to the through holes 14 of the air suction and release driving assembly 1, the end hole 541 of the fixing casing 50, and the opening hole 43 of the massage housing 40. Therefore, when the pressure in the first chamber 11 of the chamber body 10 is adjusted, the pressure adjustment cavity 501 correspondingly generates pressure changes, so that the massage device generates suction force to act on the human body.

It can be understood that the groove 13 formed by the extending wall 103 of the chamber body 10 serves as a guide, so that the air in the end cavity 54 of the fixing casing 50 can enter and exit the first chamber 11 through the groove 13.

The fixing casing 50 further forms a motor cavity 55 which has a perforation 551. The driving motor 31 can be fixed and accommodated in the motor cavity 55, and the output shaft 312 of the driving motor 31 extends out of the motor cavity 55 through the perforation 551, so as to be coupled with the transmission unit 32.

The motor cavity 55 is communicated and intersected with the assembling chamber 531, and the transmission unit 32 is correspondingly arranged at the intersection of the motor cavity 55 and the assembling chamber 531. The fixing casing 50 forms a bending point 502 at the position corresponding to the transmission unit 32, so as to reasonably arrange the chamber body 10 and the driving motor 31 of the air suction and release driving assembly 1, and make the overall size more compact.

In addition, the outer surface of the fixing casing 50 can have a plurality of fixing grooves 58, and the inner surface of the massage housing 40 can be correspondingly provided with multiple fixing protrusions. In this way, each fixing protrusion is retained in the corresponding fixed groove 58, so that the massage housing 40 can be securely held on the fixing casing 50.

The fixing casing 50 further forms a controller accommodating cavity 56 and a power module accommodating cavity 57 between the first casing part 51 and the second casing part 52 for accommodating the controller 56 and the power module 70 respectively.

As shown in FIGS. 9 to 14, a massage device and an air suction and release driving assembly 1 according to a second embodiment of the present invention are illustrated. The massage device comprises the air suction and release driving assembly 1, a flexible massage housing 40, a fixing casing 50, a controller 60, and a power module 70. The fixing casing 50 is used to fix the air suction and release driving assembly 1, the controller 60, and the power module 70. The massage housing 40 is provided at an outer side of the fixing casing 50. The controller 60 is used to control the operation of the air suction and release driving assembly 1. The power module 70 supplies power to the controller 60 and the air suction and release driving assembly 1.

In this embodiment, the air suction and release driving assembly 1 for the massage device comprises a chamber body 10, a plug 20 movably arranged in the chamber body 10, and a driving unit 30 for driving the plug 20. The plug 20 is arranged in the chamber body 10 to form a first chamber 11 and a second chamber 12 on opposite sides of the plug 20. When the driving unit 30 drives the plug 20 to move back and forth in the chamber body 10, the volume sizes of the first chamber 11 and the second chamber 12 can be adjusted, so as to adjust the air pressure in the first chamber 11 and provide the suction force required for the massage device.

In this embodiment, the chamber body 10 has two through holes 14 on the top side, which are a first through hole 141 and a second through hole 142. The chamber body 10 also comprises a plurality of check valves 15, comprising an inlet check valve 151 disposed at the first through hole 141 and an outlet check valve 152 disposed at the second through hole 142.

The inlet check valve 151 allows external air from the chamber body 10 to enter the first chamber 11, while the air in the first chamber 11 does not pass through the inlet check valve 151 to reach the outside of the chamber body 10. The outlet check valve 152 does not allow external air from the chamber body 10 to enter the first chamber 11, but allows the air in the first chamber 11 to be discharged through the outlet check valve 152 and reach the pressure adjustment cavity 501 outside the chamber body 10.

Figure 14:
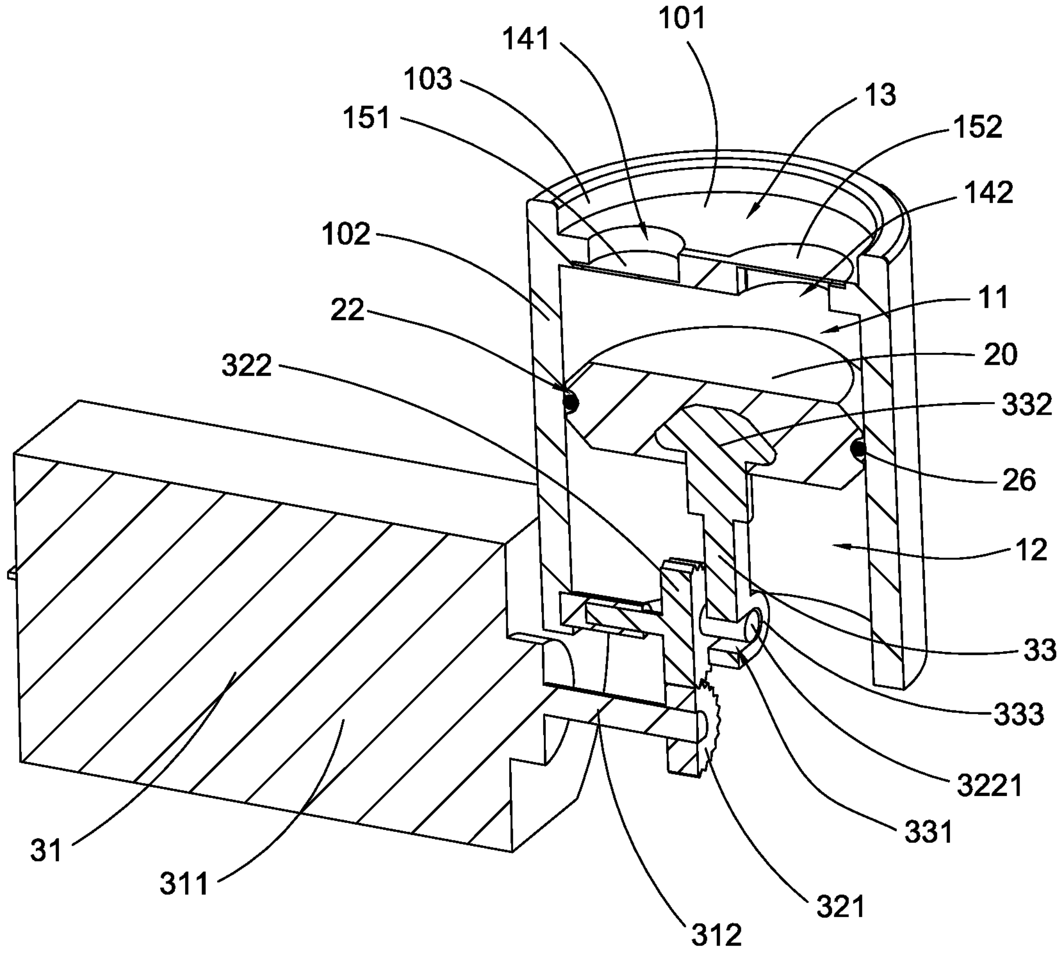
FIG. 14 is a perspective view from another angle of the air suction and release driving assembly of the massage device after being cut along the center line according to the second preferred embodiment of the present invention.
Figure 15:
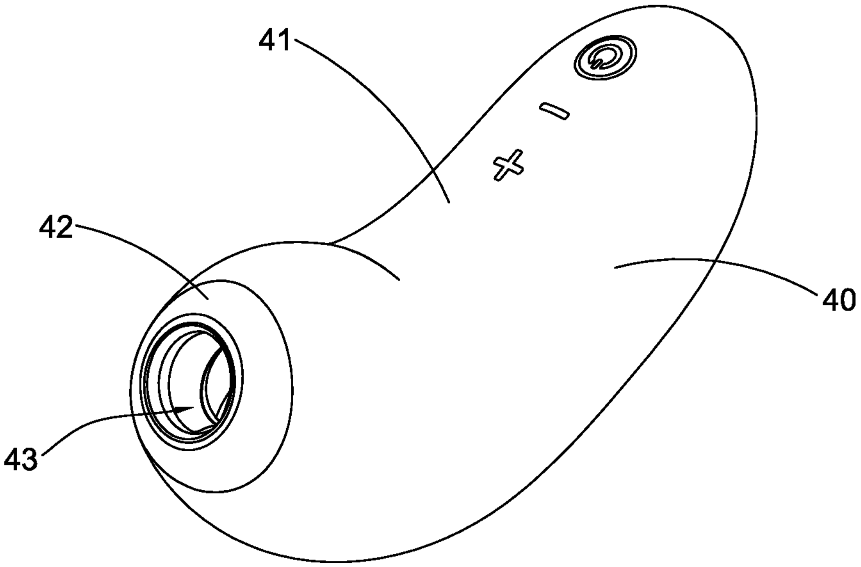
FIG. 15 is a perspective view of a massage device that generates suction force according to a third preferred embodiment of the present invention.

Preferably, the inlet check valve 151 is provided on a bottom side of the first through hole 141, and the outlet check valve 152 is provided on a top side of the first through hole 142, thus facilitating the guidance of airflow. As shown in FIG. 14, the inlet check valve 151 is fitted on the bottom surface of the top wall 101 of the chamber body 10, so that the first through hole 141 is located on the top side of the inlet check valve 151. Therefore, when the plug 20 is driven to move away from the top wall 101 to increase the volume of the first chamber 11, the air in the groove 13 can easily enter the first through hole 141, pass through the inlet check valve 151 after being buffered in the first through hole 141, and enter the first chamber 11.

The outlet check valve 152 can be adhered to the top surface of the top wall 101 of the chamber body 10, so that the second through hole 142 is located on the bottom side of the outlet check valve 152. Therefore, when the plug 20 is driven to move towards the top wall 101 to exhaust the air in the first chamber 11, the air in the first chamber 11 is first guided into the second through hole 142, and then passes through the second through hole 142 and is discharged to the groove 13 of the chamber body 10 through the outlet check valve 152. Furthermore, the air enters the end cavity 54 of the fixing casing 50, and is blown towards the end hole 541 of the fixing casing 50 and the opening hole 43 of the massage housing 40.

It can be understood that each of the check valves 50 can be various structures that allow the air to pass through and prevent air backflow, for example, typical check valve structures comprising a valve core, a valve body, a reset spring, and a steel ball. The inlet check valve 151 is disposed on the bottom side of the first through hole 141, so that during the suction process, the air from the pressure adjustment cavity 501 enters the first through hole 141, accumulating pressure through the first through hole 141. The higher pressure in the first through hole 141 can force the inlet check valve 151 to be open, so as to form the inlet path towards the first chamber 11. During the exhaust process, the pressure inside the first chamber 11 cannot open the inlet check valve 151, thus the air cannot enter the pressure adjustment cavity 501 through the first through hole 141.

The outlet check valve 152 is disposed on the top side of the second through hole 142, so that during the air release process, the air in the first chamber 11 first enters the second through hole 142 to accumulate pressure in the second through hole 142, and when the pressure in the second through hole 142 reaches a higher level, the exhaust valve 152 can be opened, so as to form an exhaust path towards the pressure adjustment cavity 501. However, during the suction process, the pressure in the pressure adjustment cavity 501 cannot open the outlet check valve 152, so that the air cannot enter the first chamber 11 through the second through hole 142.

Figure 12:
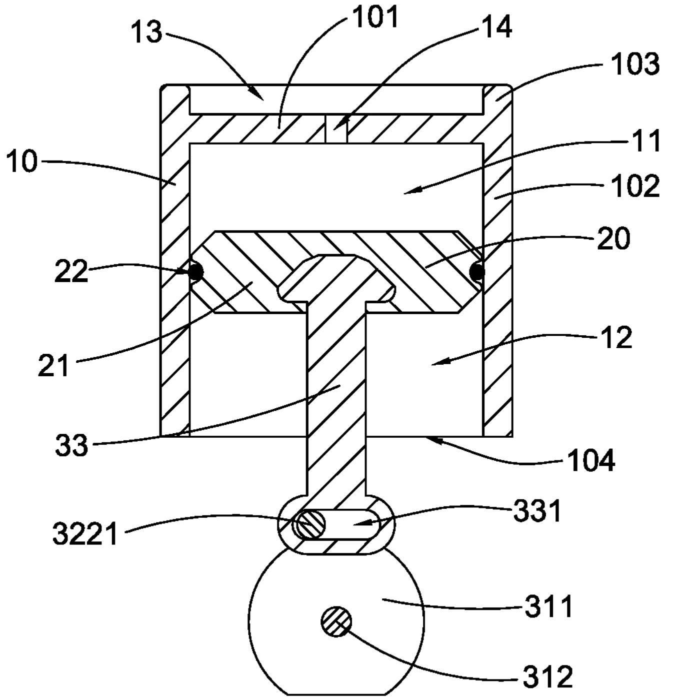
FIG. 12 is a sectional view of the air suction and release driving assembly of the massage device according to the above second preferred embodiment of the present invention.
Figure 13:
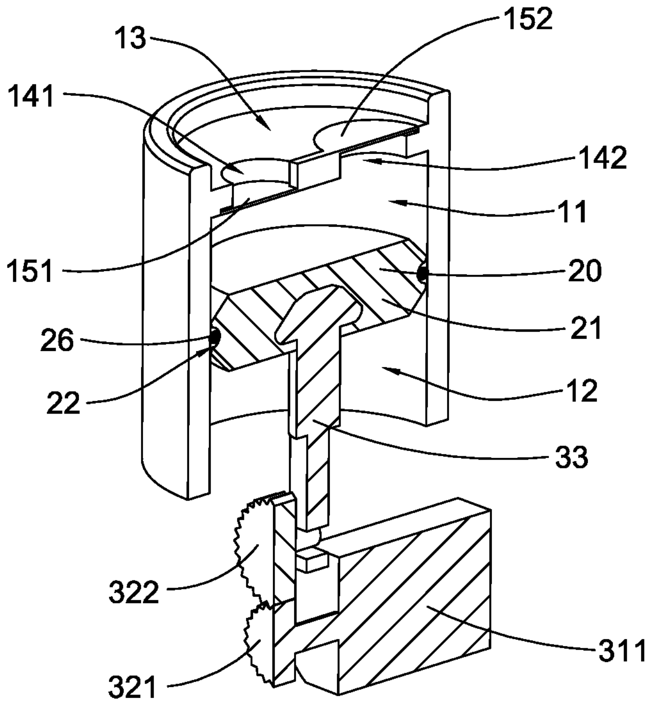
FIG. 13 is a perspective view of the air suction and release driving assembly of the massage device after being cut along a center line according to the above second preferred embodiment of the present invention.

Referring to FIGS. 12 to 14, when the plug 20 is driven to move downward, the air enters the first chamber 11 through the first through hole 141 via the inlet check valve 151, causing the air suction and release driving assembly 1 to generate the suction force required by the massage device. When the plug 20 is driven to move upward, the air is discharged from the first chamber 11 through the second through hole 14 via the outlet check valve 152, causing the air suction and release driving assembly 1 to return to its initial state.

In this embodiment, the air enters the first chamber 11 from the pressure adjustment cavity 501 through the first through hole 141 and passes through the inlet check valve 151, and the air leaves the first chamber 11, enters the second through hole 142 and passes through the outlet check valve 152 to enter the pressure adjustment cavity 501. Thus, the chamber body 10 itself provides a smooth, seamless and circulating airflow path, ensuring that the massage device can generate suction at the head housing portion 42 of the massage housing 40 periodically and continuously for massaging the human body part.

Correspondingly, the present invention provides a method for generating suction massage, comprising periodic suction steps and exhaust steps, thereby generating massage on the contacted human body part.

More specifically, in the suction step, the driving motor 31 drives the transmission unit 32 to drive the driving rod 33 to move the plug 20 in the chamber body 10, thereby increasing the volume of the first chamber 11, so that the air in the pressure adjustment cavity 501 enters the first chamber 11 through the through hole 14, causing suction at the opening hole 43 of the massage housing 40 to act on the human body part.

In the air exhaust step, the driving motor 31 drives the transmission unit 32 to drive the driving rod 33 to move the plug 20 in the chamber body 10, thereby reducing the volume of the first chamber 11, so that the air in the first chamber 11 enters the pressure adjustment cavity 501 through the through hole 14 and blows towards the opening hole 43 of the massage housing 40.

In this embodiment of the present invention, the driving motor 31 drives the transmission unit 32 to reciprocally move the eccentric shaft 3221, thereby realizing the reciprocating lifting motion of the driving rod 33 and further driving the plug 20 to reciprocally move in the chamber body 10.

When the check valves 15 are respectively disposed in the through holes 14, in the suction step, the driving motor 31 drives the transmission unit 32 to drive the driving rod 33 to move the plug 20 in the chamber body 10, thereby increasing the volume of the first chamber 11, so that the air in the pressure adjustment cavity 501 enters the first chamber 11 through the first through hole 141 and passes through the inlet check valve 151, causing suction at the opening hole 43 of the massage housing 40 to act on the human body part.

In the air exhaust step, the driving motor 31 drives the transmission unit 32 to drive the driving rod 33 to move the plug 20 in the chamber body 10, thereby reducing the volume of the first chamber 11, so that the air in the first chamber 11 passes through the second through hole 142 and enters the pressure adjustment cavity 501 through the outlet check valve 152, and finally blow towards the opening hole 43 of the massage housing 40.

As shown in FIGS. 15 to 22, an air suction and release driving assembly 1 and a massage device generating suction according to a third preferred embodiment of the present invention are illustrated. The massage device comprises the air suction and release driving assembly 1, a flexible massage housing 40, a fixing casing 50, a controller 60, and a power module 70. It should be understood that the air suction and release driving assembly 1 of the present invention is a driving unit used to drive the massage device. The massage device may comprise the controller 60 implemented as a circuit board, the power module 70, the flexible massage housing 40, and other massage components such as a vibrator. The controller 60 and the power module 70 of the massage device can be electrically connected to a driving unit 30 of the the air suction and release driving assembly 1 to provide power supply to the driving unit 30 and control the operation of the driving unit 30. The flexible massage housing 40 can be fitted at an outer side of the fixing casing 50 of the air suction and release driving assembly 1, and the flexible massage housing 40 can be implemented as a silicone or rubber sleeve suitable for contacting with body parts.

Figure 16:
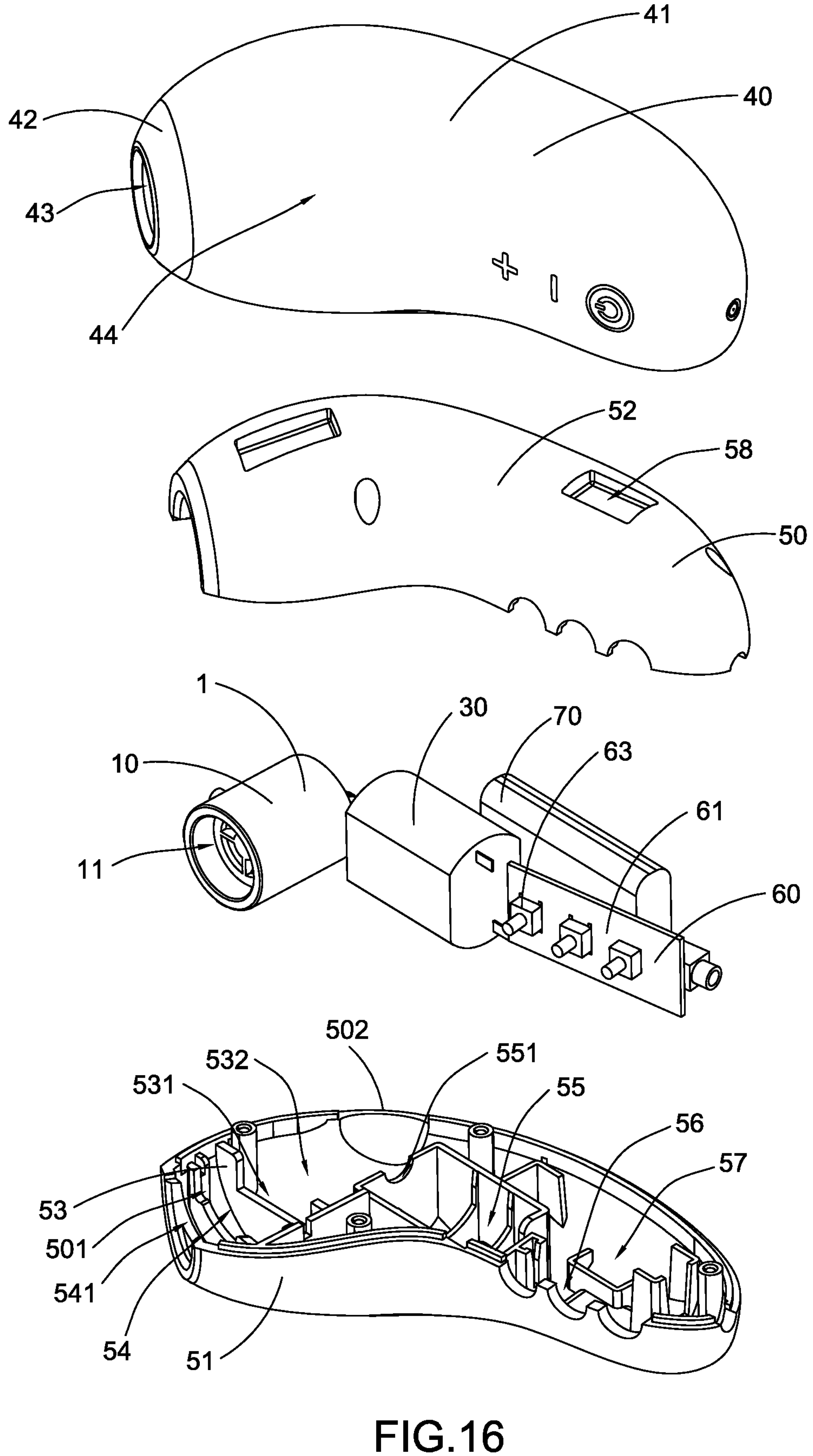
FIG. 16 is an exploded view of the massage device that generates suction force according to the above third preferred embodiment of the present invention.
Figure 17:
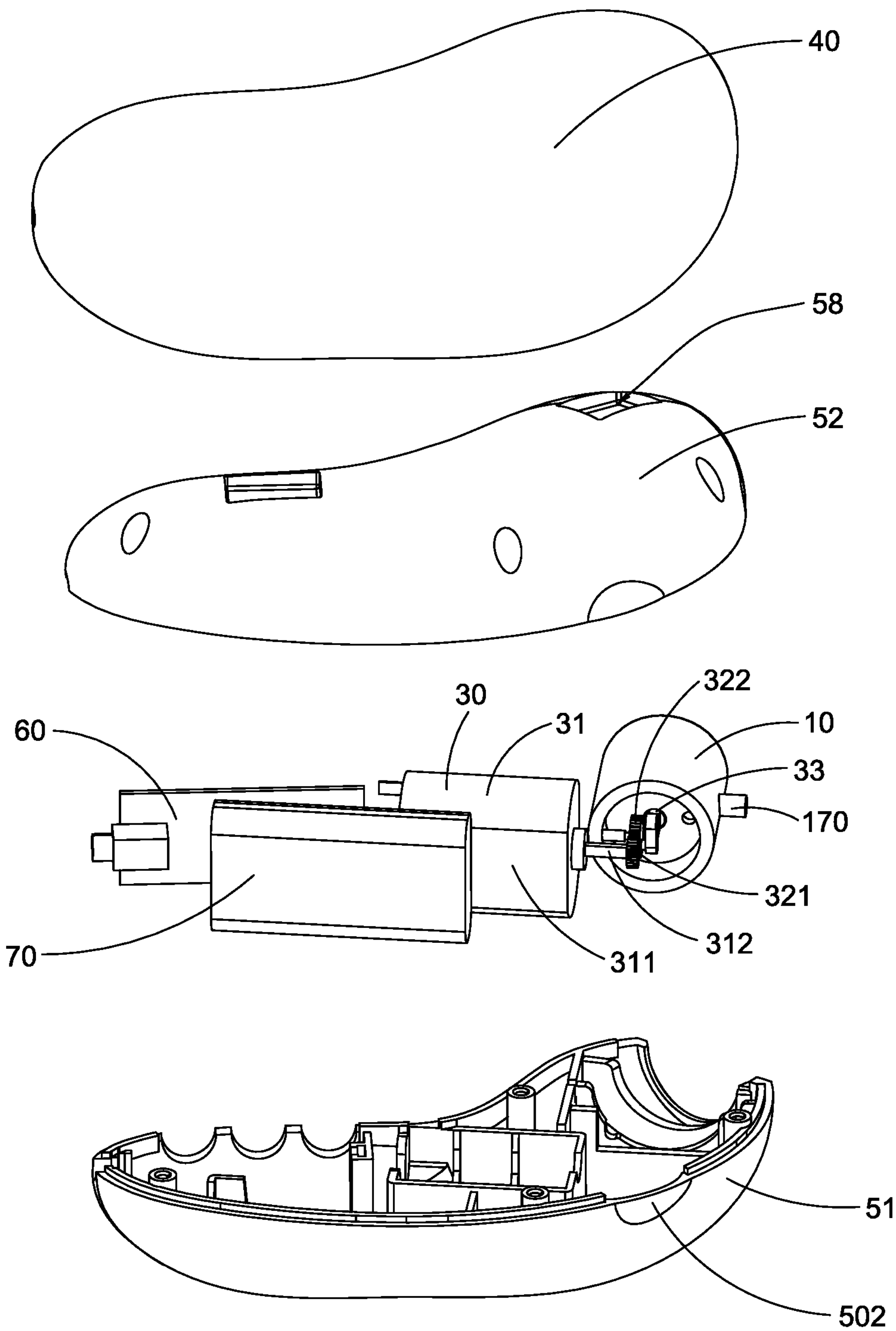
FIG. 17 is an exploded view from another angle of the massage device that generates suction force according to the above third preferred embodiment of the present invention.
Figure 18:
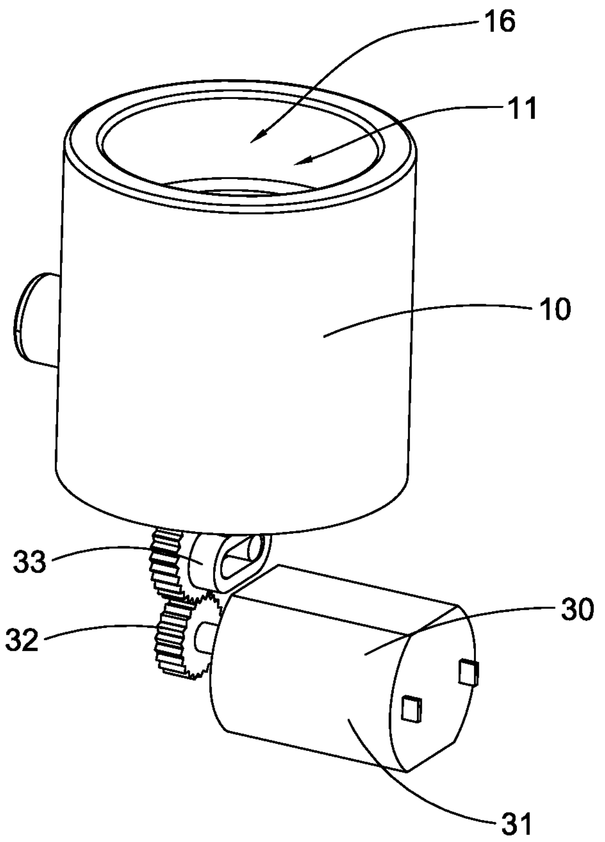
FIG. 18 is a perspective view of an air suction and release driving assembly of the massage device that generates suction force according to the above third preferred embodiment of the present invention.
Figure 19:
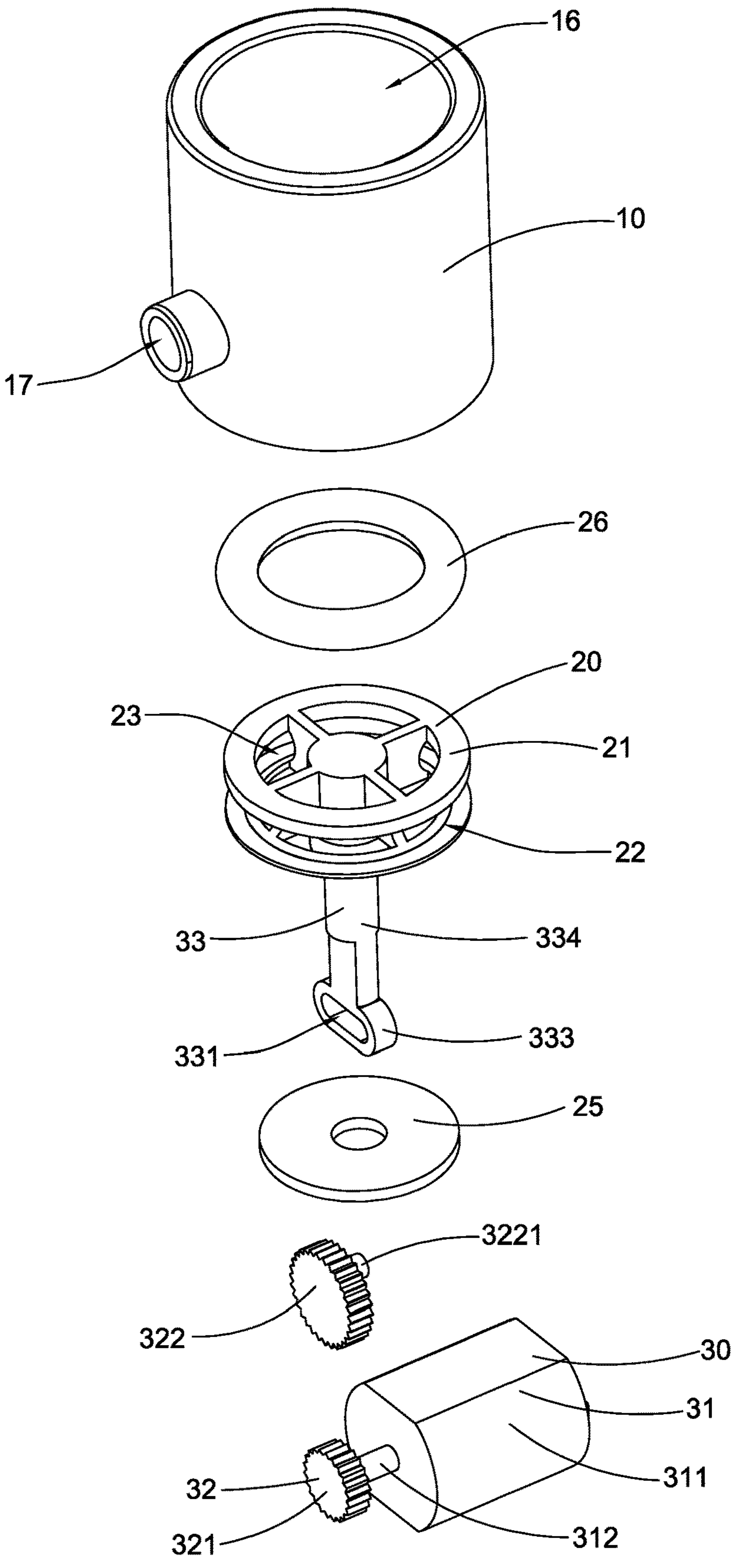
FIG. 19 is an exploded view of the air suction and release driving assembly of the massage device that generates suction force according to the above third preferred embodiment of the present invention.

As shown in FIGS. 16 and 17, the flexible massage housing 40 comprises a main body 41 and a head housing portion 42. The head housing portion 42 has an opening hole 43, and is connected to the main body 41 to form an inner cavity 44 for accommodating the air suction and release driving assembly 1, the fixing casing 50, the controller 60, and the power module 70. The opening hole 43 is in communication with the inner cavity 44, and allows air to enter and exit the opening hole 43 under the driving action of the air suction and release driving assembly 1.

The main body 41 and the head housing portion 42 can be integrally formed and both are made of flexible material. Alternatively, the head housing portion 42 can be made of flexible material while the main body 41 is made of flexible or rigid material. In this embodiment, the main body 41 and the head housing portion 42 are integrally formed from the same flexible material such as silicone or rubber, so as to form a unitary structure with the inner cavity 44 through methods such as hot pressing or injection molding.

The fixing casing 50 is used to assemble the air suction and release driving assembly 1, the controller 60, and the power module 70. The flexible massage housing 40 is placed outside the fixing casing 50, thereby accommodating the fixing casing 50, the air suction and release driving assembly 1, the controller 60, and the power module 70 inside the massage housing 40.

The power module 70 comprises a rechargeable battery, such as a lithium battery, lead-acid battery, nickel-cadmium battery, nickel-iron battery, nickel-hydrogen battery, etc., to provide power supply for the controller 60 and the air suction and release driving assembly 1. The controller 60 comprises a control circuit board 61 and one or more switches 62, such as buttons, knobs, etc., which are exposed outside the massage housing 40 for user operation. In the example shown in the drawings, each switch 62 is a button. The controller 60 can also control one or more control components 63, such as two control components 63, to respectively control the working power of the air suction and release driving assembly 1.

As shown in FIGS. 16 to 22, the air suction and release driving assembly 1 for the massage device according to the third embodiment of the present invention comprises a chamber body 10, a plug 20 movably disposed within the chamber body 10, and the driving unit 30 for driving the plug 20. The plug 20 is arranged in the chamber body 10 to form a first chamber 11 and a second chamber 12 on opposite sides of the plug 20. When the driving unit 30 drives the plug 20 to move back and forth in the chamber body 10, the volume sizes of the first chamber 11 and the second chamber 12 can be adjusted, thereby adjusting the air pressure in the first chamber 11 to provide the suction required by the massage device.

The chamber body 10 forms an opening 16 on a top side thereof and form the first chamber 11, i.e., the chamber body 10 forms an opening end on the top side. The flexible massage housing 40 of the massage device can be fitted onto the fixing casing 50, and the opening hole 43 of the massage housing 40 corresponds to the opening end of the chamber body 10. It should be understood that in other alternative embodiments, the chamber body 10 may also include a top wall on the top side, and the top wall may have one or more through holes communicated with the first chamber 11.

In this embodiment, the plug 20 has one or more vent holes 23. The plug 20 forms a circular assembly groove 24 on the bottom side, and an annular movable valve element 25 is provided in the assembly groove 24. The valve element 25 can be made of a flexible material such as silicone film, rubber sheet, or other materials. When the plug 20 has a plurality of vent holes 23, these vent holes 23 are arranged along the circumference, and the position of the valve element 25 can be aligned with these vent holes 23.

The chamber body 10 also forms an exhaust hole 17 in a surrounding wall for communicating with the second chamber 12. The vent holes 23 of the plug 20 are designed to cooperate with the valve element 25, so that in the exhaust process of the air suction and release driving assembly 1, the first chamber 11 and the second chamber 12 are communicated, and air further passes through the exhaust hole 17 to reach the outside of the chamber body 10. The surrounding wall of the chamber body 10 can be connected to an exhaust pipe 170 to form the exhaust hole 17.

Figure 20:
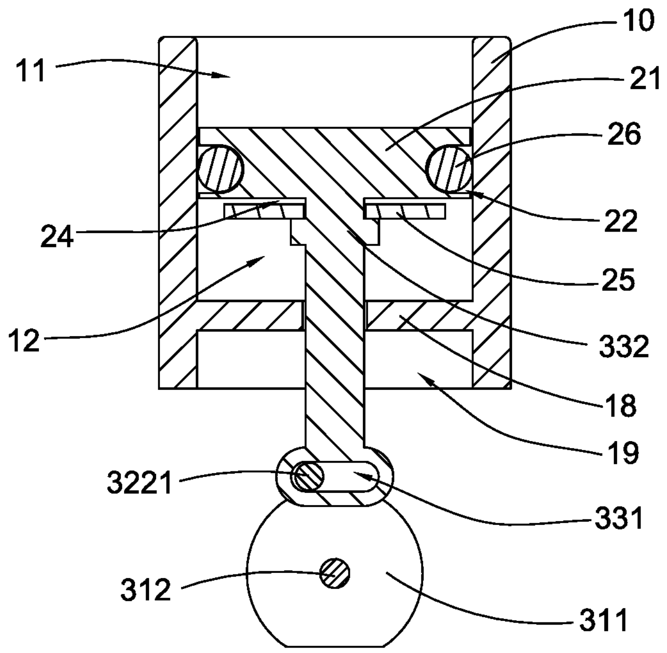
FIG. 20 is a sectional view of the air suction and release driving assembly of the massage device that generates suction force according to the above third preferred embodiment of the present invention.
Figure 21:
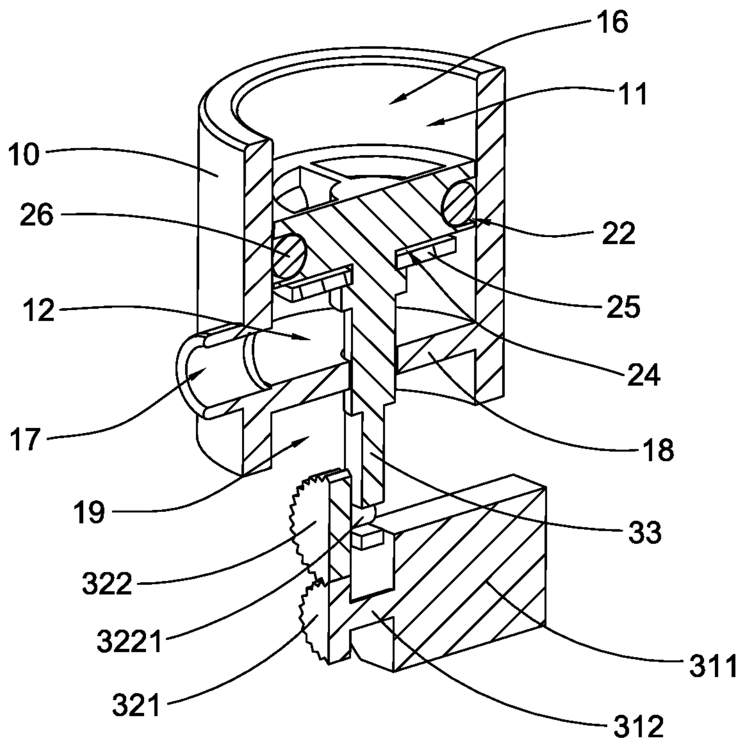
FIG. 21 is a perspective view of the air suction and release driving assembly of the massage device that generates suction force after being cut along the center line according to the above third preferred embodiment of the present invention.
Figure 22:
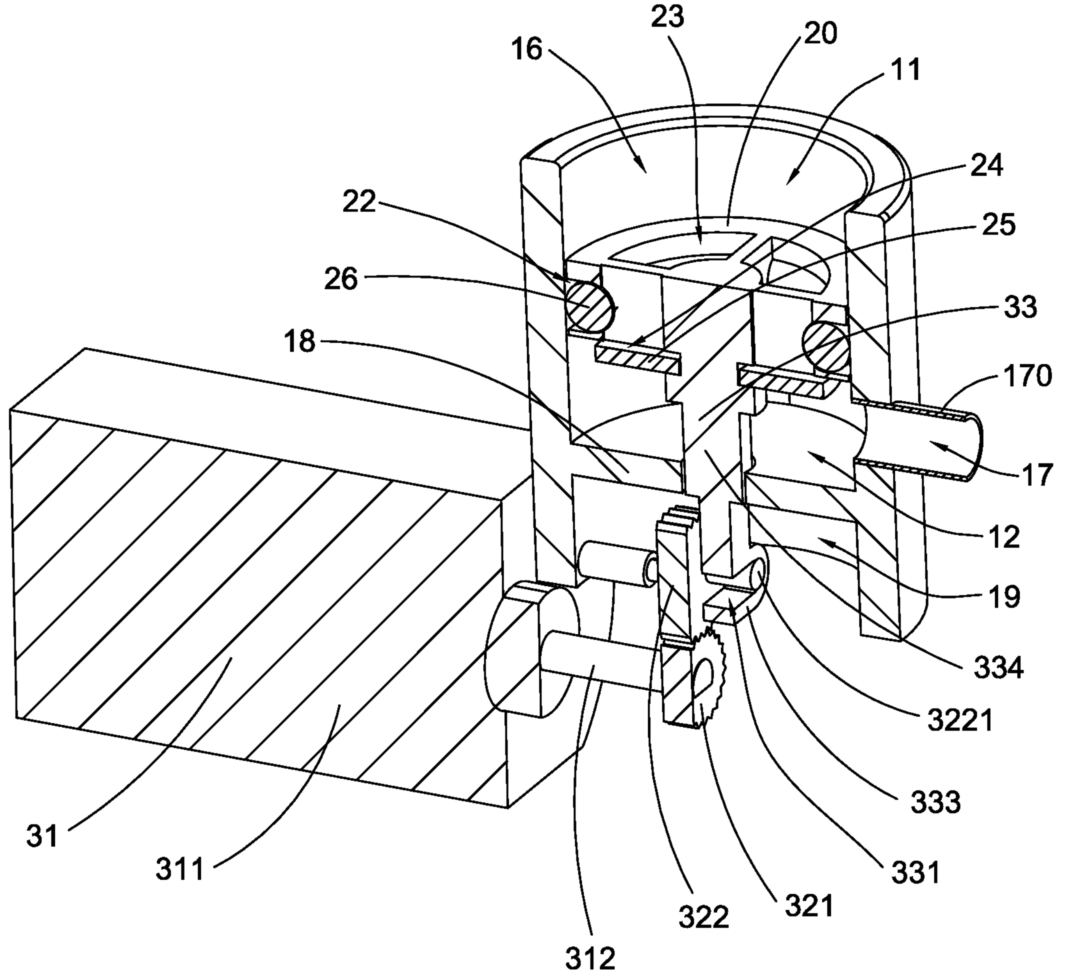
FIG. 22 is a perspective view from another angle of the air suction and release driving assembly of the massage device that generates suction force after being cut along the center line according to the above third preferred embodiment of the present invention.

More specifically, in this embodiment, referring to FIGS. 20 to 22, when the plug 20 is driven to move downward, the flexible valve element 25 in the assembly groove 24 is tightly attached to the bottom side of the plug body 21, so that the vent holes 23 cannot be communicated with the second chamber 12, thereby generating the suction force required by the massage device. When the plug body 20 is driven to move upward, there is a gap between the valve element 25 in the assembly groove 24 and the bottom side of the plug body 21, and part of the air in the first chamber 11 flows towards the opening hole 43 of the massage housing 40, while the other part of the air enters the second chamber 12 through the vent holes 23 and is discharged through the exhaust hole 17, so that the air suction and release driving assembly 1 returns to its initial state.

In other words, in this embodiment, when the air in the first chamber 11 is exhausted, not all of the air is exhausted towards the opening hole 43 of the massage housing 40, so as not to quickly release and detach the skin tissue or muscles sucked by the massage device from the opening hole 43, thereby maintaining the suction of the massage device on the user's body part for as long as possible during the suction and release air cycle, thereby enhancing the effect of suction massage.

The edge of the plug body 21 can also form a circular positioning groove 22 which is used to accommodate a waterproof sealing element 26 that is made of silicone gel, rubber, or other materials such as flexible rubber rings or films, so as to enhance air tightness and further prevent water from entering the first chamber 11 from entering the second chamber 12.

In this embodiment, the chamber body 10 may also comprise a separation layer 18, so as to form a third chamber 19 on the bottom side of the second chamber 12. The driving rod 33 of the driving unit 30 passes through the separation layer 18 to extend into the third chamber 19 and is connected to the transmission unit 32. In this way, the air entering the second chamber 12 is guided and discharged from the exhaust hole 17 on the surrounding wall of the chamber body 10 without entering the third chamber 19.

In this embodiment, when the opening hole 43 of the massage housing 40 of the massage device is close to a human body part, the first chamber 11 can generate changes in air pressure under the action of the plug 20. Specifically, when the first chamber 11 is inhaled with the air due to its communication with the opening hole 43, the air in the space between the opening hole 43 of the massage housing 40 and the first chamber 11 is sucked into the first chamber 11. The skin tissue or muscles of the human body part adjacent to the opening hole 43 formed by the head housing portion 42 of the massage housing 40 are sucked. When the first chamber 11 is released, the skin tissue or muscles of the human body part adjacent to the opening hole 43 formed by the head housing portion 42 of the massage housing 40 are loosened. In this way, the massage device uses the air suction and release driving assembly 1 to generate changes in air pressure in the first chamber 11, so that the opening hole 43 produces changes in air pressure at the corresponding position, thereby achieving a suction massage on the human body part.

In this embodiment, the plug 20 comprises a plug body 21 which separates the first chamber 11 from the second chamber 12, so as to form a pressure-adjustable environment in the first chamber 11 to generate suction. The chamber body 10 can be cylindrical, thus forming a cylindrical space inside. Accordingly, the plug body 21 of the plug 20 can implement a cylindrical sealing pad.

The driving unit 30 comprises a driving motor 31, a transmission unit 32, and a driving rod 33, wherein the driving rod 33 is connected to the plug body 21 and is partially inserted into the second chamber 12. When the driving motor 31 is operating, it drives the driving rod 33 to move periodically and reciprocally through the transmission unit 32, thereby further driving the plug 20 to move periodically and reciprocally in the chamber body 10, thereby adjusting the volume size of the first chamber 11 to generate the suction required for the massage device.

The driving rod 33 comprises an installation end 332 adjacent to the plug 20, and a connecting end 333 adjacent to the driving motor 31. The driving rod 33 comprises a rod body 334 formed between the installation end 332 and the connecting end 333. The installation end 332 and the connecting end 333 are enlarged end portions in comparison with the rod body 334. The installation end 332 is connected to the bottom of the plug 20 and forms the assembly groove 24. The connecting end 333 has a connecting hole 331.

More specifically, in this embodiment, the driving motor 31 is a motor comprising a motor body 311 and an output shaft 312. The transmission unit 32 comprises a first driving gear 321 and a second driving gear 322. The second driving gear 322 comprises an eccentric shaft 3221. The first driving gear 321 is connected to the output shaft 312 of the driving motor 31, and the second driving gear 322 is engaged with the first driving gear 321. The bottom end of the driving rod 33 has the connecting hole 331. The eccentric shaft 3221 of the second driving gear 322 is positioned in the connecting hole 331 of the driving rod 33. When the driving motor 31 operates, the first driving gear 321 connected to the output shaft 3221 is driven to rotate, thereby driving the second driving gear 322 to rotate, causing the eccentric shaft 3221 to generate displacement, thereby driving the movement of the driving rod 33 through the movement of the eccentric shaft 3221, and ultimately driving the movement of the plug 20 in the chamber body 10. When the first driving gear 321 and the second driving gear 322 complete one rotation cycle, the plug 20 in the chamber body 10 generates a reciprocating movement cycle.

More specifically, when the driving motor 31 rotates, the first driving gear 321 and the second driving gear 322 are driven by the output shaft 312 to rotate. When the eccentric shaft 3221 moves towards the direction of the driving motor 31, the driving rod 33 synchronously moves towards the driving motor 31, causing the plug 20 to move towards the driving motor 31, thereby increasing the volume of the first chamber 11 and causing the pressure in the space between the first chamber 11 and the opening hole 43 of the massage housing 40 to decrease, forming a negative pressure and producing a suction massage on the human body part.

By driving the first driving gear 321 and the second driving gear 322 through the output shaft 312, the eccentric shaft 3221 is driven to move away from the driving motor 31. When the eccentric shaft 3221 reaches the bottom position, it is driven upward by the second driving gear 322. The driving rod 33 synchronously moves away from the driving motor 31, causing the plug 20 to move away from the driving motor 31, thereby reducing the volume of the first chamber 11 and discharging gas, resulting in an increase in air pressure in the space between the first chamber 11 and the opening hole 43 of the massage housing 40, and restoring the initial air pressure. In this way, the massage device can perform periodic suction massage on the human body.

With the arrangement direction and configuration of the structural components shown in FIGS. 20 to 22, when the plug 20 is driven to move downward, the air enters the first chamber 11, thereby generating the suction force required by the massage device through the air suction and release driving assembly 1. When the plug 20 is driven to move upward, the air is discharged from the first chamber 11, thereby restoring the air suction and release driving assembly 1 to its initial state.

The fixing casing 50 in this embodiment comprises a first casing part 51 and a second casing part 52 which are assembled together to form a space for accommodating the air suction and release driving assembly 1, the controller 60, and the power module 60.

More specifically, the fixing casing 50 comprises a positioning element 53 which forms a positioning groove 531. In this embodiment, the positioning element 53 may comprise a positioning plate provided on at least one of the first casing part 51 and the second casing part 52, and the positioning groove 531 is formed in the middle of the positioning plate to securely hold the chamber body 10 of the air suction and release driving assembly 1 in position. It should be understood that in this embodiment, both the first casing part 51 and the second casing part 52 can have similar structures of the positioning component 511 and the positioning groove 531. When the first casing part 51 and the second casing part 52 are fastened together, the chamber body 10 of the air suction and release driving assembly 1 is positioned in the fixing grooves formed by the two positioning grooves 531, and an assembling chamber 532 is formed in the fixing casing 50 to accommodate the chamber body 10 of the air suction and release driving assembly 1.

The fixing casing 50 further has an end cavity 54 which is located on an opposite side of the positioning element 53, and the end cavity 54 has an end hole 541 at its end which is aligned with the opening hole 43 of the massage housing 40. The end cavity 54 is communicated to the first chamber 10 of the air suction and release driving assembly 1.

The end cavity 54 of the fixing casing 50 forms a pressure adjustment cavity 501 which is communicated to the first chamber 11 of the air suction and release driving assembly 1, the end hole 541 of the fixing casing 50, and the opening hole 43 of the massage housing 40. Therefore, when the air pressure is adjusted in the first chamber 11 of the chamber body 10, the pressure adjustment cavity 501 generates corresponding pressure changes, so that the massage device generates suction force to act on the human body part.

The fixing casing 50 further forms a motor cavity 55 which has a perforation 551. The driving motor 31 can be fixed and accommodated in the motor cavity 55, and the output shaft 312 of the driving motor 31 extends out of the motor cavity 55 through the perforation 551, so as to be coupled with the transmission unit 32.

The motor cavity 55 is communicated to and intersected with the assembling chamber 531, and the transmission unit 32 is correspondingly arranged at the intersection of the motor cavity 55 and the assembling chamber 531. The fixing casing 50 has a bending point 502 at the position corresponding to the transmission unit 32, thus reasonably arranging the chamber body 10 and the driving motor 31 of the air suction and release driving assembly 1, and making the overall size more compact.

In addition, the outer surface of the fixing casing 50 can be provided with a plurality of fixing grooves 58, and the inner surface of the massage housing 40 can correspondingly be provided with a plurality of fixing protrusions. In this way, each fixing protrusion is held in the corresponding fixing groove 58, so that the massage housing 40 can be securely held in the fixing casing 50.

Furthermore, the fixing casing 50 further forms a controller accommodating groove 56 and a power module accommodating groove 57 between the first casing part 51 and the second casing part 52 for accommodating the controller 56 and the power module 70 respectively.

Figure 23:
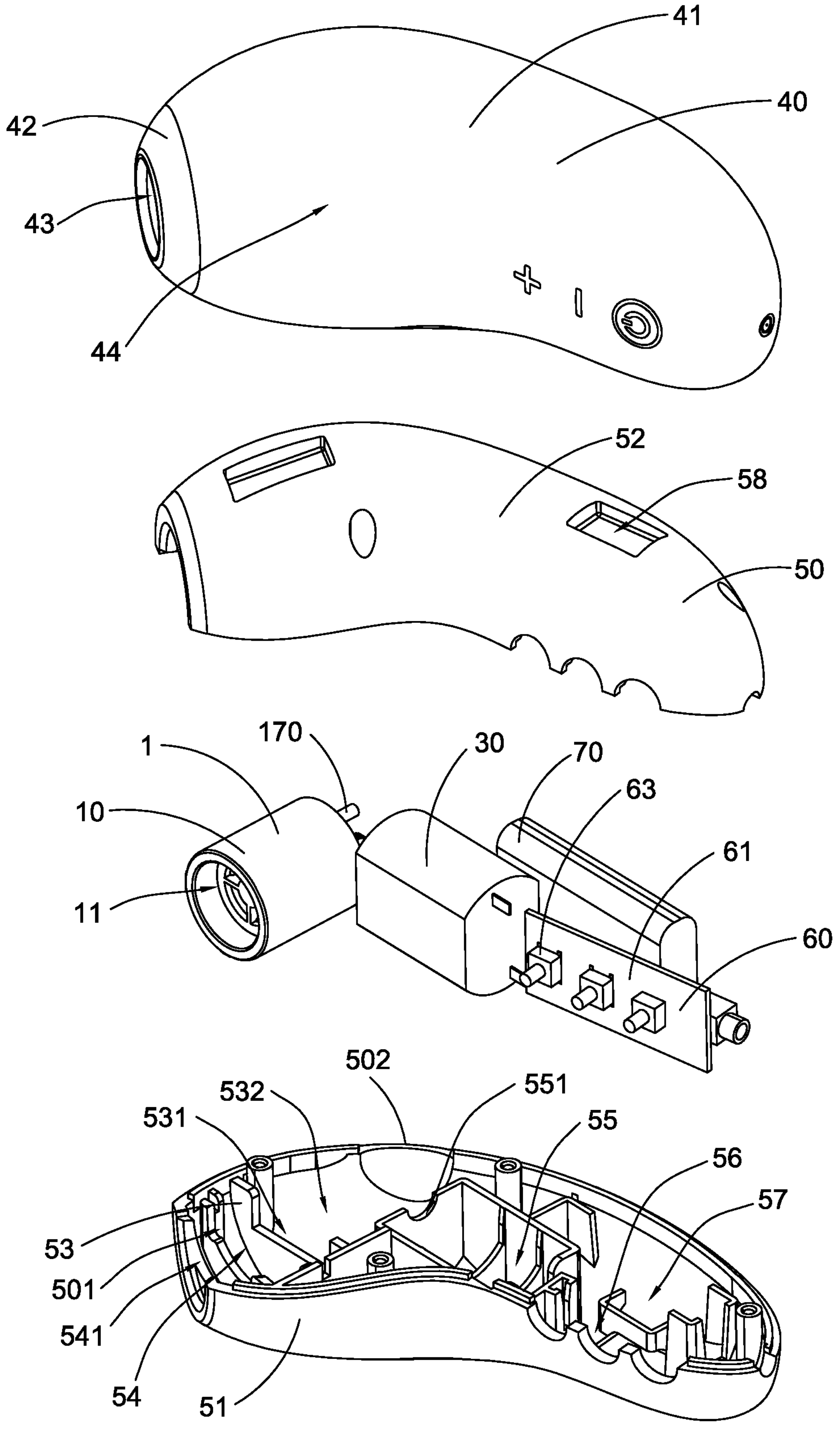
FIG. 23 is an exploded view of the massage device that generates suction force according to a fourth preferred embodiment of the present invention.
Figure 24:
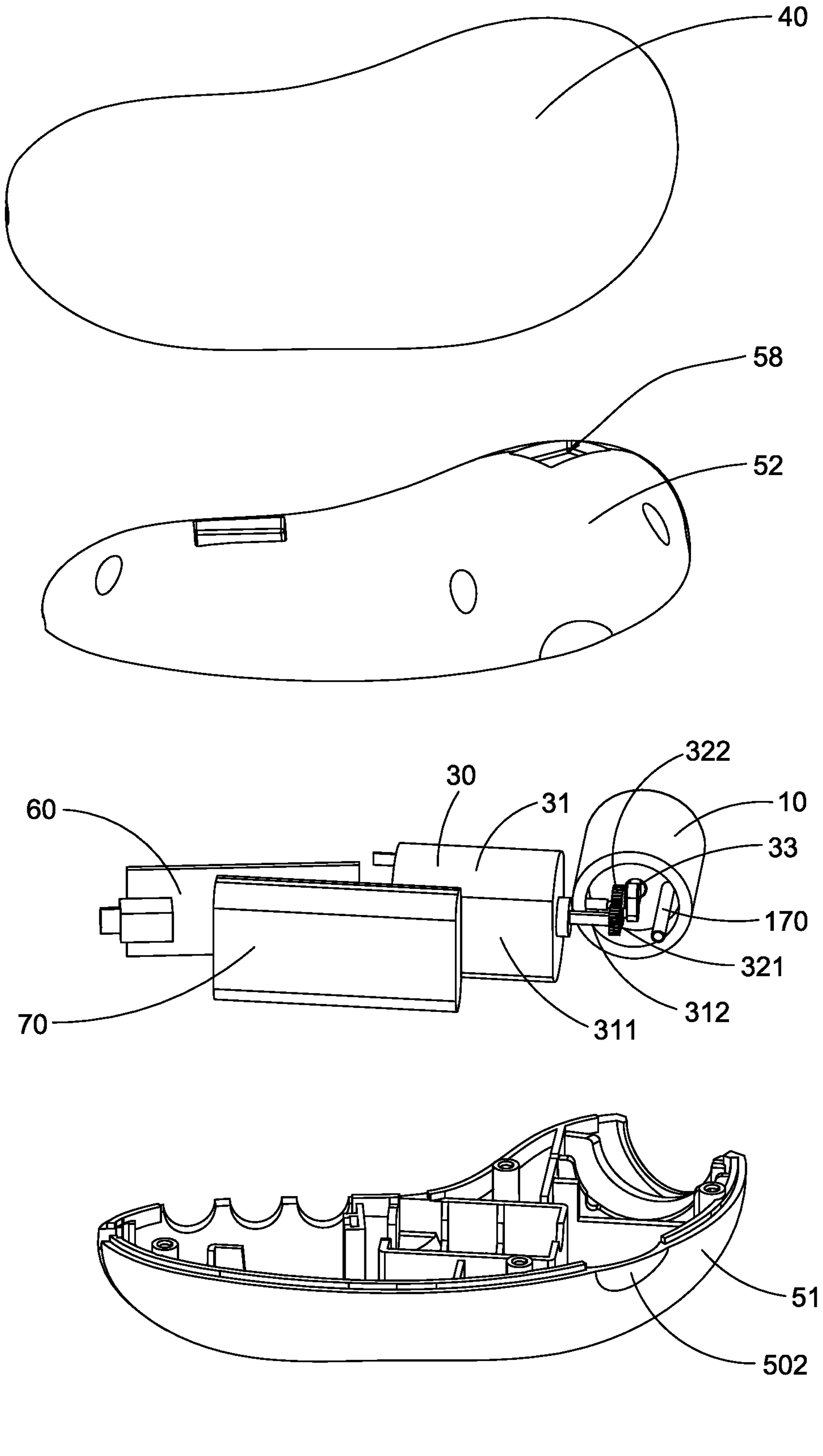
FIG. 24 is an exploded view from another angle of the massage device that generates suction force according to the above fourth preferred embodiment of the present invention.
Figure 25:
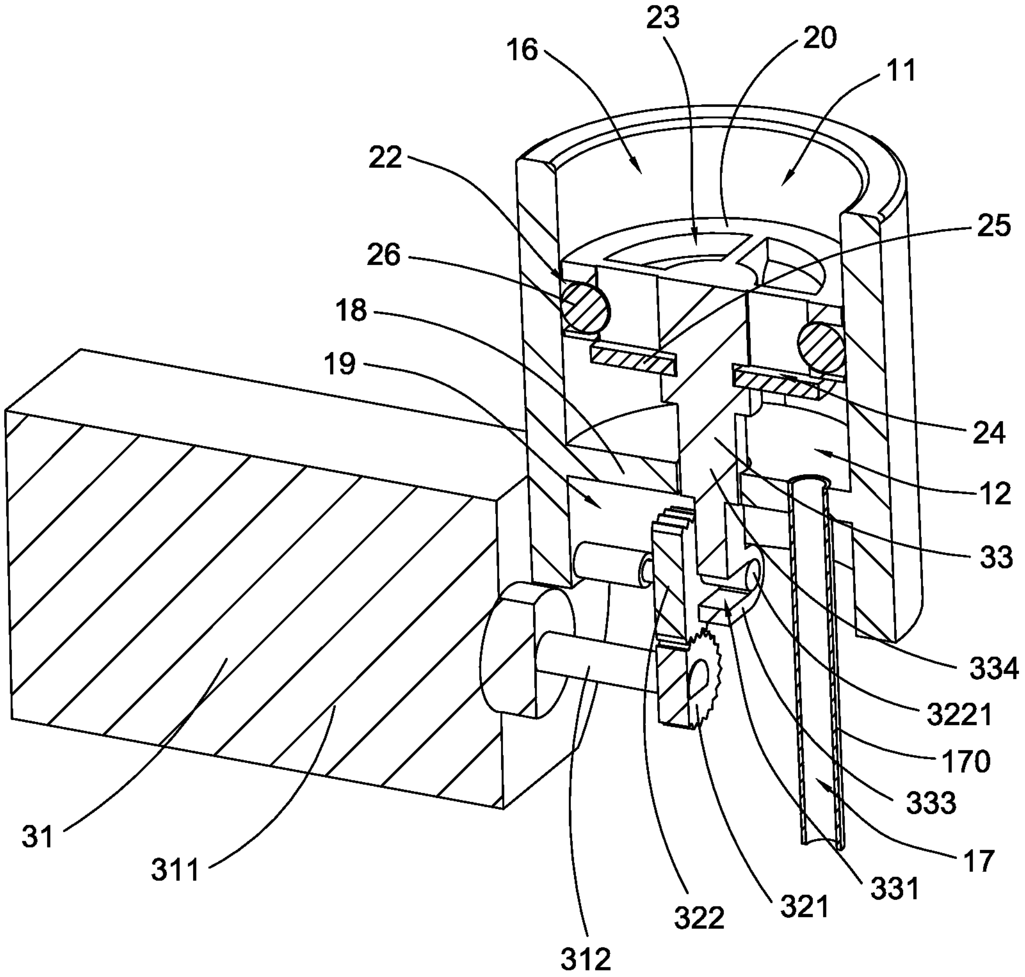
FIG. 25 is a perspective view of the air suction and release driving assembly of the massage device after being cut open according to the above fourth preferred embodiment of the present invention.

As shown in FIGS. 23 to 25, a massage device generating suction and its air suction and release driving assembly 1 according to a fourth preferred embodiment of the present invention are illustrated. The massage device comprises the air suction and release driving assembly 1, a flexible massage housing 40, a fixing casing 50, a controller 60, and a power module 70.

In this embodiment, the air suction and release driving assembly 1 for the massage device comprises a chamber body 10, a plug 20 movably disposed within the chamber body 10, and a driving unit 30 for driving the plug 20. The plug 20 is arranged within the chamber body 10 to form a first chamber 11 and a second chamber 12 on opposite sides of the plug 20 within the chamber body 10. When the driving unit 30 drives the plug 20 to move back and forth within the chamber body 10, the volume sizes of the first chamber 11 and the second chamber 12 can be adjusted, thereby allowing the air pressure in the first chamber 11 to be regulated and providing the suction force required for the massage device.

The chamber body 10 forms an opening 16 of the first chamber 11 on the top side, that is, the chamber body 10 forms an opening end on the top side. The flexible massage housing 40 of the massage device can be placed on the fixing casing 50, and its opening hole 43 is aligned with the opening end of the chamber body 10. The plug 20 has one or more vent holes 23, and the plug 20 forms a circular and ring-shaped assembly groove 24 on the bottom side, and an annular movable and flexible valve element 25 is provided in the assembly groove 24. The valve element 25 can be a flexible material such as silicone film, rubber sheet or other materials. The vent holes 23 of the plug 20 are adapted to cooperate with the valve element 25 to communicate the first chamber 11 with the second chamber 12 when the air suction and release driving assembly 1 is in the suction process.

In this embodiment, the chamber body 10 may further comprise a separation layer 18, so that a third chamber 19 is formed on the bottom side of the second chamber 12, and the driving rod 33 of the driving unit 30 is penetrated through the separation layer 18 to extend into the third chamber 19 and is connected to the transmission unit 32.

The chamber body 10 forms an exhaust hole 17 on the bottom side of the second chamber 12, which is located below the separation layer 18. When the vent holes 23 of the plug 20 is not blocked by the valve element 25, the first chamber 11 and the second chamber 12 are communicated in the suction process of the air suction and release driving assembly 1, and further air exhaust is performed through the exhaust hole 17 on the bottom side of the second chamber 12.

As shown in FIGS. 23 to 25, in this embodiment, an exhaust pipe 170 is installed on the separation layer 18 to form the exhaust hole 17, so as to guide the air in the second chamber 12 into the assembling chamber 532 of the fixing casing 50.

More specifically, in this embodiment, as shown in FIG. 25, when the plug 20 is driven to move downward, the flexible valve element 25 in the assembly groove 24 is tightly attached to the bottom side of the plug body 21, so that the vent holes 23 cannot be communicated with the second chamber 12, thereby generating the suction force required by the massage device. When the plug body 20 is driven to move upward, the valve element 25 in the assembly groove 24 is not tightly attached to the bottom side of the plug body body 21, and a gap is created between the bottom of the plug body 20 and the flexible valve element 25. A part of the air in the first chamber 11 flows towards the opening hole 43 of the massage housing 40, while the other part enters the second chamber 12 through the vent holes 23, and is discharged through the exhaust hole 17 on the bottom side of the second chamber 12, so that the air suction and release driving assembly 1 returns to its initial state.

The edge of the plug body body 21 can also form a circular positioning groove 22, which is used to accommodate a waterproof sealing element 26 that can be made of silicone, rubber, or other materials such as flexible rubber rings or films, thereby enhancing air tightness and further preventing water from entering the second chamber 12 from the first chamber 11.

Accordingly, the present invention provides a method for generating suction massage, comprising periodic suction and release steps for massaging the contacting body parts.

More specifically, in the suction step, the driving motor 31 drives the transmission unit 32 to drive the driving rod 33 to move the plug 20 in the chamber body 10, thereby increasing the volume of the first chamber 11, so that the air in the pressure adjustment cavity 501 enters the first chamber 11, causing suction at the opening hole 43 of the massage housing 40 to act on the human body part.

In the exhaust step, the driving motor 31 drives the transmission unit 32 to drive the driving rod 33 to move the plug 20 in the chamber body 10, thereby reducing the volume of the first chamber 11, so that part of the air in the first chamber 11 enters the air chamber adjustment cavity 501, while the other part passes through the vent holes 23 and flows into the second chamber 12 because the flexible valve element 25 is spaced apart from the bottom of the plug body 21, and is discharged from the exhaust hole 17 on the side or bottom surface.

In this embodiment of the present invention, the eccentric shaft 3221 of the transmission unit 32 driven by the driving motor 31 is reciprocally moved, thereby achieving the reciprocating up and down movement of the driving rod 33, further driving the plug 20 to reciprocally move in the chamber body 10.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A massage device, comprising:

a fixing casing; and an air suction and release driving assembly fixed in the fixing casing, wherein said air suction and release driving assembly comprises:

a chamber body;

a plug movably disposed in said chamber body to form a first chamber; and a driving unit coupled to said plug, wherein when said driving unit drives said plug to reciprocate in said chamber body, an air pressure of said first chamber of said chamber body is adjusted, so as to allow said massage device to generate suction;

wherein said chamber body forms said first chamber and a second chamber, and when said driving unit drives said plug to periodically reciprocate in said chamber body, volume sizes of said first chamber and said second chamber are adjusted;

wherein said second chamber is provided with an exhaust hole formed on a bottom side of said second chamber opposite the plug, or formed on a surrounding wall of said second chamber adjacent the plug, wherein said driving unit drives said plug to reciprocate in said chamber body to form an inhalation process and an exhalation process, so as to adjust the air pressure in said first chamber, and in said inhalation process, the air in said first chamber is prevented from entering said second chamber, and in said exhalation process, at least a part of the air in said first chamber is allowed to enter said second chamber and is discharged through said exhaust hole;

wherein said plug comprises a plug body having one or more vent holes, and said plug is provided with a flexible valve element which is arranged to allow or prevent said first chamber from communicating with said second chamber through said one or more vent holes;

wherein said plug has a ring-shaped assembly groove under said plug body, and said flexible valve element is disposed in said assembly groove to align with said one or more vent holes, wherein when said plug is driven to move to increase the volume size of said first chamber, said flexible valve element in said assembly groove is tightly attached to a bottom side of said plug body, so that said one or more vent holes are not communicated with said second chamber, thereby allowing said massage device to generate suction, and when said plug is driven to move to decrease the volume size of said first chamber, said flexible valve element in said assembly groove is spaced apart from said bottom side of said plug body to form a gap allowing part of the air in said first chamber to enter said second chamber through said one or more vent holes, so as to be discharged through said exhaust hole.

2. The massage device according to claim 1, wherein said driving unit comprises a driving motor, a transmission unit, and a driving rod, wherein said driving rod is connected to said plug, and when said driving motor is in operation, said driving motor drives said driving rod to move back and forth periodically through said transmission unit, so as to drive said plug to move back and forth periodically in said chamber body.

3. The massage device according to claim 2, wherein said driving motor comprises a motor body and an output shaft, and said transmission unit comprises a first driving gear and a second driving gear, wherein said second driving gear comprises an eccentric shaft, said first driving gear is connected to said output shaft of said driving motor, said second driving gear is engaged with said first driving gear, and a bottom end of said driving rod has a connecting hole, and said eccentric shaft of said second driving gear is positioned in said connecting hole of said driving rod.

4. The massage device according to claim 1, wherein said massage device further comprises a flexible massage housing, wherein said flexible massage housing comprises a head housing part with an opening hole, said fixing casing has an end hole, said opening hole of said head housing part is communicated to said end hole, and said fixing casing has an end cavity to form a pressure adjustment cavity which is communicated to said first chamber.

5. The massage device according to claim 1, wherein an edge of said plug forms a circular positioning groove, wherein a flexible sealing element is disposed in said circular positioning groove.

* * * * *